United States Patent
Cirello Filho et al.

(10) Patent No.: US 12,284,224 B1
(45) Date of Patent: Apr. 22, 2025

(54) VIRTUALIZED PERMISSION AND SECURITY ENFORCEMENT

(71) Applicant: strongDM, Inc., Palo Alto, CA (US)

(72) Inventors: Carlos Ulderico Cirello Filho, South San Francisco, CA (US); Philip D. Hassey, Rye, CO (US); Kevin David Jamieson, North Vancouver (CA); Justin Allan McCarthy, Redwood City, CA (US); Amol Kabe, Palo Alto, CA (US); Karim Fanous, Seattle, WA (US)

(73) Assignee: strongDM, Inc., Palo Alto, CA (US)

( * ) Notice: Subject to any disclaimer, the term of this patent is extended or adjusted under 35 U.S.C. 154(b) by 0 days.

(21) Appl. No.: 18/740,667

(22) Filed: Jun. 12, 2024

Related U.S. Application Data

(60) Provisional application No. 63/542,220, filed on Oct. 3, 2023.

(51) Int. Cl.
    *H04L 9/40*     (2022.01)
    *G06F 9/455*     (2018.01)

(52) U.S. Cl.
    CPC .......... *H04L 63/20* (2013.01); *G06F 9/45558* (2013.01); *H04L 63/1425* (2013.01);
    (Continued)

(58) Field of Classification Search
None
See application file for complete search history.

(56) References Cited

U.S. PATENT DOCUMENTS

| | | |
|---|---|---|
| 7,233,569 B1 | 6/2007 | Swallow |
| 7,752,466 B2 | 7/2010 | Ginter et al. |

(Continued)

FOREIGN PATENT DOCUMENTS

CA      2847507 A1 * 11/2014 ............. G06F 21/45

OTHER PUBLICATIONS

Office Communication for U.S. Appl. No. 17/900,121 mailed Apr. 4, 2023, 13 Pages.

(Continued)

*Primary Examiner* — Joseph P Hirl
*Assistant Examiner* — Hassan Saadoun
(74) *Attorney, Agent, or Firm* — John W. Branch; Branch Partners PLLC

(57) ABSTRACT

Embodiments are directed to managing interactions with applications. A plurality of interactions with the application that are enforced by the native security policies may be determined. A virtual policy interface may be generated to collect information associated with a plurality of other interactions with the application that may be unassociated with the native security policies. A virtual policy engine may be employed to perform further actions, including: determining activities based on the collected information associated with the plurality of other interactions; determining virtual security policies associated with the plurality of other interactions based on the activities. the user identity, or the like; validating one or more of the plurality of other interactions based on the virtual security policies such that the validated other interactions may be employed to execute operations in the application and such that other operations associated with one or more invalidated other interactions may be disabled.

30 Claims, 23 Drawing Sheets

(52) U.S. Cl.
CPC .............. *G06F 2009/45587* (2013.01); *G06F 2009/45595* (2013.01)

(56) References Cited

U.S. PATENT DOCUMENTS

| | | | |
|---|---|---|---|
| 7,886,339 | B2 | 2/2011 | Keohane et al. |
| 8,102,814 | B2 | 1/2012 | Rahman et al. |
| 8,135,815 | B2 | 3/2012 | Mayer |
| 9,082,402 | B2 | 7/2015 | Yadgar et al. |
| 9,176,758 | B2* | 11/2015 | Swaminathan ....... G06F 9/5077 |
| 9,178,793 | B1 | 11/2015 | Marlow |
| 9,239,834 | B2 | 1/2016 | Donabedian et al. |
| 9,300,635 | B1 | 3/2016 | Gilde et al. |
| 9,584,523 | B2* | 2/2017 | Santhiveeran ........ H04L 63/102 |
| 9,632,828 | B1 | 4/2017 | Mehta et al. |
| 9,800,517 | B1 | 10/2017 | Anderson |
| 10,075,334 | B1 | 9/2018 | Kozura et al. |
| 10,110,593 | B2 | 10/2018 | Karroumi et al. |
| 10,117,098 | B1 | 10/2018 | Naguthanawala et al. |
| 10,292,033 | B2 | 5/2019 | Beyer et al. |
| 10,645,562 | B2 | 5/2020 | Beyer et al. |
| 10,735,263 | B1 | 8/2020 | Mcalary et al. |
| 11,075,747 | B1 | 7/2021 | Holsman |
| 11,102,147 | B2 | 8/2021 | Mehta et al. |
| 11,290,143 | B1 | 3/2022 | Sternowski |
| 11,316,822 | B1 | 4/2022 | Gawade et al. |
| 11,323,919 | B1 | 5/2022 | Parulkar et al. |
| 11,375,300 | B2 | 6/2022 | Sagie et al. |
| 11,412,051 | B1 | 8/2022 | Chiganmi et al. |
| 11,431,497 | B1 | 8/2022 | Liguori et al. |
| 11,521,444 | B1 | 12/2022 | Badik et al. |
| 11,528,147 | B2 | 12/2022 | Madisetti et al. |
| 11,546,323 | B1 | 1/2023 | Jones et al. |
| 11,546,763 | B1 | 1/2023 | Filho et al. |
| 11,599,714 | B2 | 3/2023 | Munro et al. |
| 11,599,841 | B2 | 3/2023 | Anisingaraju et al. |
| 11,620,103 | B2 | 4/2023 | Graham et al. |
| 11,729,620 | B1 | 8/2023 | Filho et al. |
| 11,736,531 | B1 | 8/2023 | Filho et al. |
| 11,765,159 | B1 | 9/2023 | Crawford et al. |
| 11,765,207 | B1 | 9/2023 | McCarthy et al. |
| 11,784,999 | B1 | 10/2023 | Jones et al. |
| 11,916,885 | B1 | 2/2024 | Cirello Filho et al. |
| 11,916,968 | B1 | 2/2024 | Cirello Filho et al. |
| 11,973,752 | B2 | 4/2024 | Crawford et al. |
| 2005/0164650 | A1 | 7/2005 | Johnson |
| 2005/0209876 | A1 | 9/2005 | Kennis et al. |
| 2006/0190991 | A1 | 8/2006 | Iyer |
| 2006/0212487 | A1 | 9/2006 | Kennis et al. |
| 2006/0240824 | A1 | 10/2006 | Henderson et al. |
| 2006/0288204 | A1 | 12/2006 | Sood et al. |
| 2007/0009104 | A1 | 1/2007 | Renkis |
| 2009/0037607 | A1 | 2/2009 | Farinacci et al. |
| 2009/0164663 | A1 | 6/2009 | Ransom et al. |
| 2009/0222559 | A1 | 9/2009 | Anipko et al. |
| 2010/0131650 | A1* | 5/2010 | Pok ....................... H04L 47/263 709/226 |
| 2011/0225311 | A1 | 9/2011 | Liu et al. |
| 2012/0304265 | A1 | 11/2012 | Richter et al. |
| 2013/0173794 | A1 | 7/2013 | Agerbak et al. |
| 2013/0198558 | A1 | 8/2013 | Rao et al. |
| 2013/0268260 | A1 | 10/2013 | Lundberg et al. |
| 2014/0044265 | A1 | 2/2014 | Kocher et al. |
| 2014/0057676 | A1 | 2/2014 | Lord et al. |
| 2014/0136970 | A1 | 5/2014 | Xiao |
| 2015/0127949 | A1 | 5/2015 | Patil et al. |
| 2015/0135300 | A1 | 5/2015 | Ford |
| 2015/0208273 | A1 | 7/2015 | Raleigh et al. |
| 2015/0281952 | A1 | 10/2015 | Patil et al. |
| 2015/0382198 | A1 | 12/2015 | Kashef et al. |
| 2016/0014669 | A1 | 1/2016 | Patil et al. |
| 2016/0014818 | A1 | 1/2016 | Reitsma et al. |
| 2016/0080128 | A1 | 3/2016 | Hebron |
| 2016/0173501 | A1 | 6/2016 | Brown |
| 2016/0180102 | A1 | 6/2016 | Kim et al. |
| 2016/0191545 | A1* | 6/2016 | Nanda .................... H04L 43/20 726/1 |
| 2016/0262021 | A1 | 9/2016 | Lee et al. |
| 2016/0294826 | A1 | 10/2016 | Han et al. |
| 2016/0314355 | A1 | 10/2016 | Laska et al. |
| 2017/0061956 | A1 | 3/2017 | Sarikaya et al. |
| 2017/0103440 | A1 | 4/2017 | Xing et al. |
| 2017/0111368 | A1 | 4/2017 | Hibbert et al. |
| 2017/0126734 | A1 | 5/2017 | Harney |
| 2017/0142810 | A1 | 5/2017 | Cho |
| 2017/0279971 | A1 | 9/2017 | Raleigh et al. |
| 2017/0339561 | A1 | 11/2017 | Wennemyr et al. |
| 2017/0364505 | A1 | 12/2017 | Sarikaya et al. |
| 2017/0372087 | A1 | 12/2017 | Lee |
| 2018/0061158 | A1 | 3/2018 | Greene |
| 2018/0123957 | A1 | 5/2018 | Chen et al. |
| 2018/0167373 | A1 | 6/2018 | Anderson et al. |
| 2018/0233141 | A1 | 8/2018 | Solomon et al. |
| 2018/0288026 | A1 | 10/2018 | Callaghan |
| 2018/0359369 | A1 | 12/2018 | Golshenas et al. |
| 2018/0367308 | A1 | 12/2018 | Kacin et al. |
| 2019/0039569 | A1 | 2/2019 | Reed et al. |
| 2019/0073373 | A1 | 3/2019 | Surale et al. |
| 2019/0075095 | A1 | 3/2019 | Venable et al. |
| 2019/0104411 | A1 | 4/2019 | Hotchkiss et al. |
| 2019/0116132 | A1 | 4/2019 | Suzuki |
| 2019/0124507 | A1 | 4/2019 | Dotchkoff et al. |
| 2019/0147154 | A1 | 5/2019 | Das |
| 2019/0349758 | A1 | 11/2019 | Zhu et al. |
| 2020/0007540 | A1 | 1/2020 | Kawaguchi et al. |
| 2020/0219023 | A1 | 7/2020 | Duchastel |
| 2020/0220848 | A1 | 7/2020 | Patwardhan |
| 2020/0257179 | A1 | 8/2020 | Barnum et al. |
| 2020/0267552 | A1 | 8/2020 | Lee et al. |
| 2020/0272911 | A1 | 8/2020 | Quiros Araya et al. |
| 2020/0296779 | A1 | 9/2020 | Moghe et al. |
| 2020/0322286 | A1 | 10/2020 | Mehta et al. |
| 2020/0323030 | A1 | 10/2020 | Mehta et al. |
| 2020/0382488 | A1 | 12/2020 | Liu et al. |
| 2021/0056524 | A1 | 2/2021 | Isgar |
| 2021/0056536 | A1 | 2/2021 | Carter et al. |
| 2021/0091941 | A1 | 3/2021 | Pancras et al. |
| 2021/0168661 | A1 | 6/2021 | Wong et al. |
| 2021/0211423 | A1 | 7/2021 | Tan et al. |
| 2021/0223128 | A1 | 7/2021 | Kirch |
| 2021/0224091 | A1 | 7/2021 | Hayatnagarkar et al. |
| 2021/0226910 | A1 | 7/2021 | Ranpise et al. |
| 2021/0281572 | A1 | 9/2021 | Fernandez-spadaro et al. |
| 2021/0294970 | A1 | 9/2021 | Bender et al. |
| 2021/0306310 | A1 | 9/2021 | Tan |
| 2021/0312400 | A1 | 10/2021 | Irimie et al. |
| 2021/0314399 | A1 | 10/2021 | Hyun et al. |
| 2021/0344492 | A1 | 11/2021 | Goodsitt et al. |
| 2021/0406902 | A1 | 12/2021 | Bernert et al. |
| 2022/0007437 | A1 | 1/2022 | Goenka et al. |
| 2022/0038544 | A1 | 2/2022 | Grinstein et al. |
| 2022/0052850 | A1 | 2/2022 | Fagan et al. |
| 2022/0086639 | A1 | 3/2022 | Lu et al. |
| 2022/0150312 | A1 | 5/2022 | Ranpise et al. |
| 2022/0159029 | A1 | 5/2022 | Bendersky et al. |
| 2022/0217084 | A1 | 7/2022 | Arora et al. |
| 2022/0263913 | A1 | 8/2022 | Zhang et al. |
| 2022/0294540 | A1 | 9/2022 | Black et al. |
| 2022/0311767 | A1 | 9/2022 | Ouellet |
| 2022/0329477 | A1 | 10/2022 | Chiganmi et al. |
| 2022/0334864 | A1 | 10/2022 | Kn et al. |
| 2023/0007439 | A1 | 1/2023 | Williams et al. |
| 2023/0027507 | A1 | 1/2023 | He et al. |
| 2023/0032790 | A1 | 2/2023 | Mahajan et al. |
| 2023/0059173 | A1 | 2/2023 | Moon |
| 2023/0067223 | A1 | 3/2023 | Freed et al. |
| 2023/0153447 | A1 | 5/2023 | Kapadia |
| 2023/0188525 | A1* | 6/2023 | Singh .................... H04L 63/101 726/29 |
| 2024/0073249 | A1 | 2/2024 | Cirello Filho et al. |
| 2024/0106821 | A1 | 3/2024 | Crawford et al. |

(56) References Cited

OTHER PUBLICATIONS

Office Communication for U.S. Appl. No. 18/091,006 mailed Apr. 19, 2023, 9 Pages.
Office Communication for U.S. Appl. No. 17/954,697 mailed May 12, 2023, 5 Pages.
Office Communication for U.S. Appl. No. 18/131,151 mailed Jun. 8, 2023, 9 Pages.
Office Communication for U.S. Appl. No. 17/954,697 mailed Jan. 20, 2023, 13 Pages.
Office Communication for U.S. Appl. No. 18/094,858 mailed Mar. 16, 2023, 10 Pages.
Office Communication for U.S. Appl. No. 18/091,006 mailed Mar. 31, 2023, 12 Pages.
Office Communication for U.S. Appl. No. 17/733,735 mailed Jul. 12, 2022, 38 Pages.
Office Communication for U.S. Appl. No. 17/733,735 mailed Nov. 1, 2022, 7 Pages.
Office Communication for U.S. Appl. No. 17/889,788 mailed Nov. 7, 2022, 12 Pages.
Office Communication for U.S. Appl. No. 18/091,895 mailed Apr. 5, 2023, 12 Pages.
Office Communication for U.S. Appl. No. 18/094,858 mailed Jul. 7, 2023, 12 Pages.
Office Communication for U.S. Appl. No. 18/131,151 mailed Jul. 10, 2023, 7 Pages.
Office Communication for U.S. Appl. No. 18/094,858 mailed Sep. 19, 2023, 4 Pages.
Office Communication for U.S. Appl. No. 18/091,895 mailed Jul. 11, 2023, 9 pages.
Office Communication for U.S. Appl. No. 18/236,360 mailed Oct. 25, 2023, 12 pages.
Office Communication for U.S. Appl. No. 18/236,360 mailed Nov. 13, 2023, 2 pages.
Office Communication for U.S. Appl. No. 18/238,649 mailed Nov. 1, 2023, 13 pages.
Office Communication for U.S. Appl. No. 18/094,858 mailed Oct. 25, 2023, 7 pages.
Office Communication for U.S. Appl. No. 18/238,649 mailed Jan. 26, 2024, 11 pages.
Office Communication for U.S. Appl. No. 18/238,649 mailed Feb. 26, 2024, 4 pages.
Office Communication for U.S. Appl. No. 18/238,649 mailed Mar. 14, 2024, 5 pages.
Office Communication for U.S. Appl. No. 18/587,821 mailed May 3, 2024, 12 pages.

* cited by examiner

VIRTUALIZED PERMISSION AND SECURITY ENFORCEMENT

CROSS-REFERENCE TO RELATED APPLICATION

This application is a Utility Patent application based on previously filed U.S. Provisional Patent Application U.S. Ser. No. 63/542,220 filed on Oct. 3, 2023, the benefit of the filing date of which is hereby claimed under 35 U.S.C. § 119(e), and the contents of which is further incorporated in entirety by reference.

TECHNICAL FIELD

The present invention relates generally to network security, and more particularly, but not exclusively, to virtualized permission and security enforcement.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, the regulatory environment has been adapting to the increase in computer-based services. Accordingly, organizations may be required to comply with regulatory regimes from multiple jurisdictions related to various critical subjects, such as finance, privacy, employee rights, cross-jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Credential management is an important feature of infrastructure security. In some cases, it may be difficult to provide centralized management of technology infrastructure without enabling centralized access to the services providing infrastructure security management. Also, relying on configuring individual applications to enforce security policies may be cumbersome because different teams may be responsible for managing the different applications. Accordingly, deploying new or updated policies may be delayed because of the time that may be necessary for updating individual application instances, and so on. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
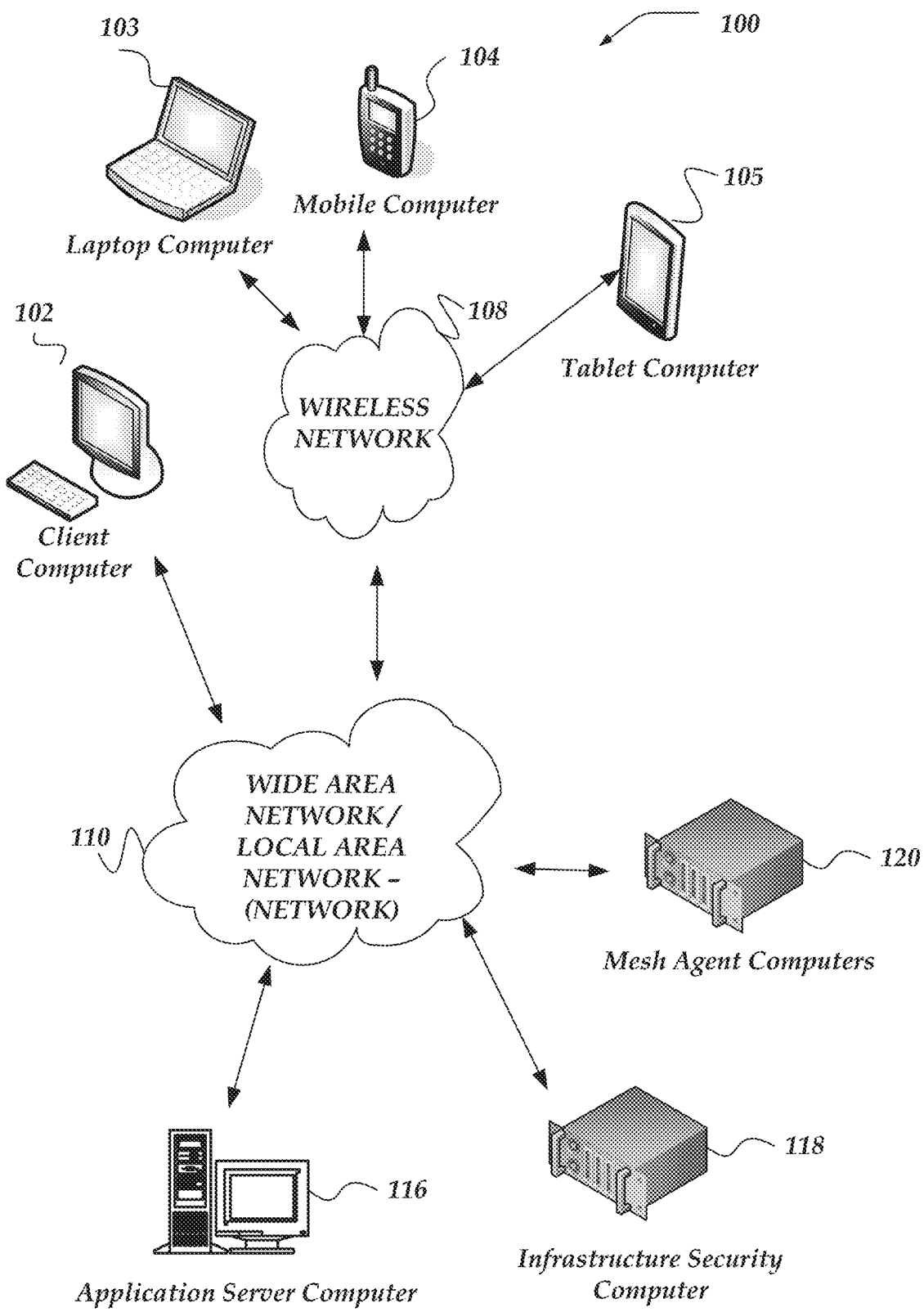
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time, and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential information" refers to data or data structures that include credential secrets that enable access to protected resource servers. For example, credential information may include usernames, passwords, pass-phrases, security certificates, or the like.

As used herein, the term "policy container" refers to data or data structures for managing policies for an overlay network. In some cases, policy containers may be associated with particular applications, application protocols, resources, or the like, referred to herein as activities that may be managed in an overlay network.

As used herein, the "activity" refers to one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

As used herein, the term "policy" refers to data or data structures that include particular instructions or declarations that may be evaluated to determine if a resource may be accessed by a client in an overlay network.

As used herein, the term "request" refers to data that may be directed from a client endpoint in an overlay network to a target resource in the overlay network. Requests may be considered to include data or messages that may initiate or establish transactions, sessions, actions, or the like, with target resources. In the course of a session, the different endpoints of a session may take on the role of clients or servers depending on the direction of communication or behavior of the application. Likewise, in some cases, requests may be considered part of streaming sessions and are not limited to being single requests that synchronously wait for a single response.

As used herein, the term "response" refers to data that may be directed from a target resource to a client endpoint in an overlay network. Responses may be considered to include data or messages that may initiate, establish, or complete transactions, sessions, actions, or the like, based on requests from clients. In the course of a session, the different endpoints of a session may take on the role of clients or servers depending on the direction of communication or behavior of the application. Likewise, in some cases, responses may be considered part of streaming sessions and are not limited to being single responses to a single response.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing interactions with applications in a computing environment. In one or more of the various embodiments, a plurality of interactions with the application that are enforced by the native security policies may be determined.

In one or more of the various embodiments, a virtual policy interface may be generated to collect information associated with a plurality of other interactions with the application that may be unassociated with the one or more native security policies.

In one or more of the various embodiments, a virtual policy engine may be employed to perform further actions, including: determining one or more activities based on the collected information associated with the plurality of other interactions such that a user identity may be associated with the one or more activities; determining one or more virtual security policies associated with the plurality of other interactions based on the one or more activities. the user identity, or the like; validating one or more of the plurality of other interactions based on the one or more virtual security policies such that the one or more validated other interactions may be employed to execute one or more operations in the application and such that one or more other operations associated with one or more invalidated other interactions may be disabled; or the like.

In one or more of the various embodiments, network traffic associated with the application may be monitored. In some embodiments, an application protocol may be determined based on the network traffic and the application. In some embodiments, the collected information may be determined based on one or more portions of the network traffic or the application protocol. Also, in some embodiments, the collected information may be provided to the virtual policy interface.

In one or more of the various embodiments, one or more submissions from the application that are provided to a local interface of the virtual policy interface may be evaluated such that the one or more submissions may be associated with the application and the plurality of other interactions. In some embodiments, the collected information may be determined based on one or more submissions. Also, in some embodiments, the collected information may be provided to the virtual policy interface.

In one or more of the various embodiments, telemetry associated with the plurality of interactions may be tracked, including one or more of a keystroke, a gaze location, a pointing device location, or the like. In some embodiments, one or more of a window, a user-interface control, or a data submission may be determined based on the telemetry. Also, in some embodiments, the collected information may be determined based on one or more of the window, the user-interface control, or the submitted data.

In one or more of the various embodiments, one or more of a window, a window class, an intra-application message, an executed system call, or the like may be determined based on one or more of a window manager or operating system that may be hosting the application. Also, in some embodiments, the collected information may be determined based on one or more of the window, the window class, the intra-application message, the executed system call, or the like.

In one or more of the various embodiments, the one or more virtual security policies may be modified at an infrastructure security computer that may be separate from a computer that may be hosting the application. In some embodiments, the modified virtual security policies may be communicated to the computer to update the virtual policy interface.

In one or more of the various embodiments, the one or more virtual security policies may be modified at a computer that may be hosting the application. In some embodiments, the virtual policy interface may be updated based on the one or more modified virtual security policies.

In one or more of the various embodiments, one or more updates to the one or more virtual security policies may be employed to revalidate the one or more of the plurality of other interactions.

Also, briefly stated, various embodiments are directed to managing access to network resources. In one or more of the various embodiments, a first mesh agent configured to provide a client with access via a secure tunnel provided by an overlay network that includes a plurality of mesh agents may be determined.

In one or more of the various embodiments, a route may be determined for a connection in the overlay network for one or more requests to access a resource from the client that is received by the first mesh agent, wherein a last mesh agent in the route provides the access to the resource over the connection.

In one or more of the various embodiments, the first mesh agent may be employed to determine an identity and an activity associated with the one or more requests based on network traffic such that the identity corresponds to an entity that may be authenticated to access the overlay network and the resource and such that the activity corresponds to one or more of an application or an application protocol that may be operative or available in the overlay network.

In one or more of the various embodiments, a policy container that is associated with the activity may be determined based on one or more characteristics of the one or more requests such that the policy container may include one or more policies associated with one or more activities.

In one or more of the various embodiments, the one or more requests may be validated based on the one or more policies included in the policy container such that the one or more validated requests may be forwarded to the resource and one or more invalidated requests may be discarded and such that persistence of the connection may be maintained during the validation of the one or more requests.

In one or more of the various embodiments, updating the policy container may cause further actions, including: determining one or more updated policies based on the updated policy container; determining one or more other activities associated with the identity based on the updated policy container and the network traffic; validating one or more other requests based on the one or more updated policies included in the updated policy container, wherein the one or more other validated requests are forwarded to the resource via the overlay network; or the like.

In one or more of the various embodiments, determining the policy container may include: determining the application protocol associated with the one or more requests based on a payload included in the one or more requests; parsing the payload based on the application protocol; determining a portion of the one or more policies associated with the parsed payload based on the identity and one or more of a protocol fragment, a regular expression, or a rule; executing one or more actions associated with the portion of the one or more policies to validate the one or more requests; or the like.

In one or more of the various embodiments, the policy container may be updated at an infrastructure security computer that may be separate from the first mesh agent and separate from the resource based on one or more of a rule or a user input. In some embodiments, the updated policy container may be communicated to the first mesh agent and each of the plurality of mesh agents.

In one or more of the various embodiments, authentication of the identity may include: communicating one or more credentials associated with the entity that corresponds to the identity to an infrastructure security computer associated with the overlay network; verifying that the one or more credentials are associated with the entity and with a privilege to access the overlay network and another privilege to access the resource; or the like.

In one or more of the various embodiments, validating the one or more requests may include: determining one or more credentials associated with the entity such that the one or more credentials may enable the entity to access the overlay network; determining a set of acceptable credentials associated with the one or more policies; in response to the one or more credentials being absent from the set of acceptable credentials, invalidating the one or more requests; or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
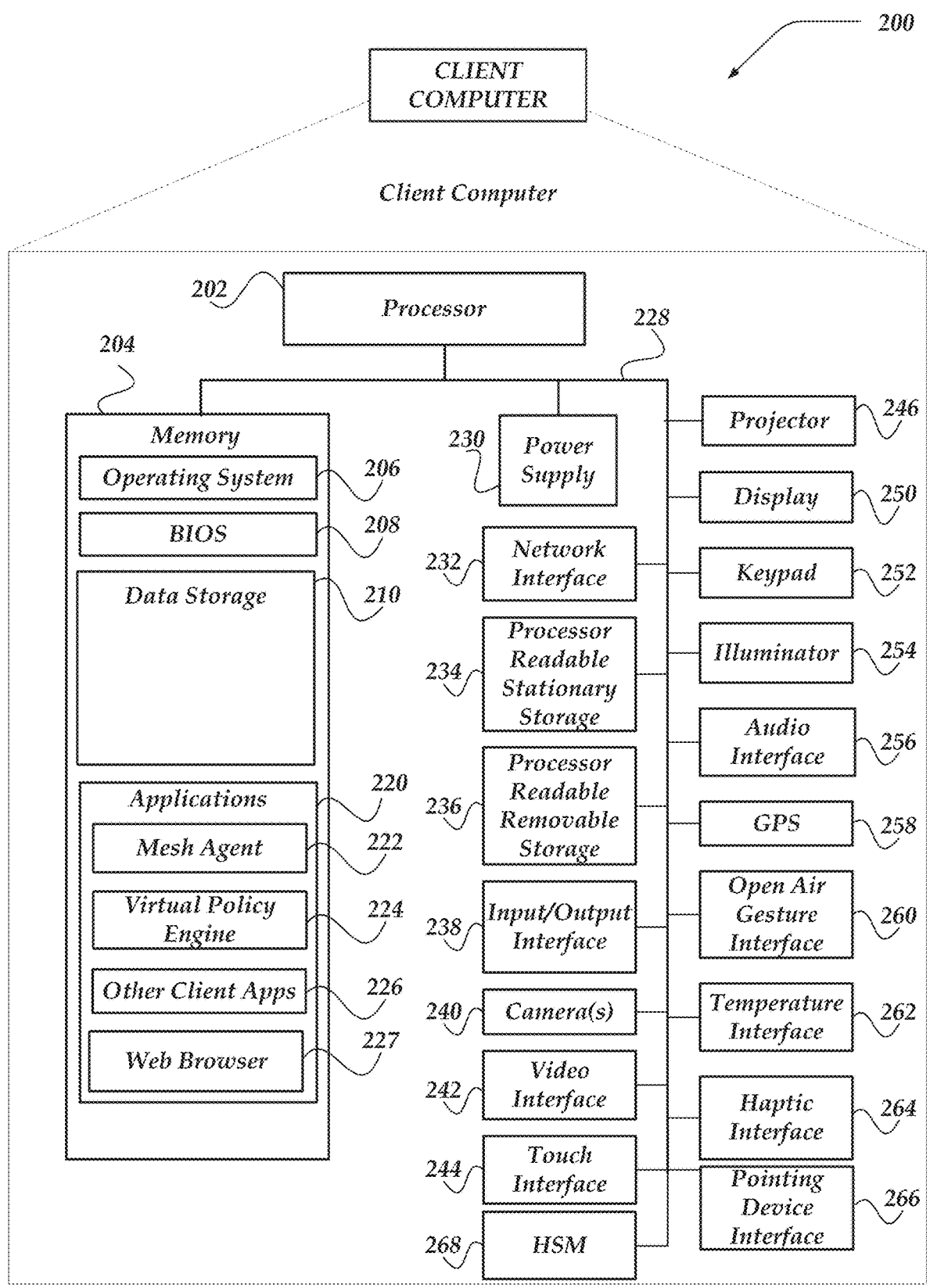
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, virtual policy engine 224, other client applications 226, web browser 227, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
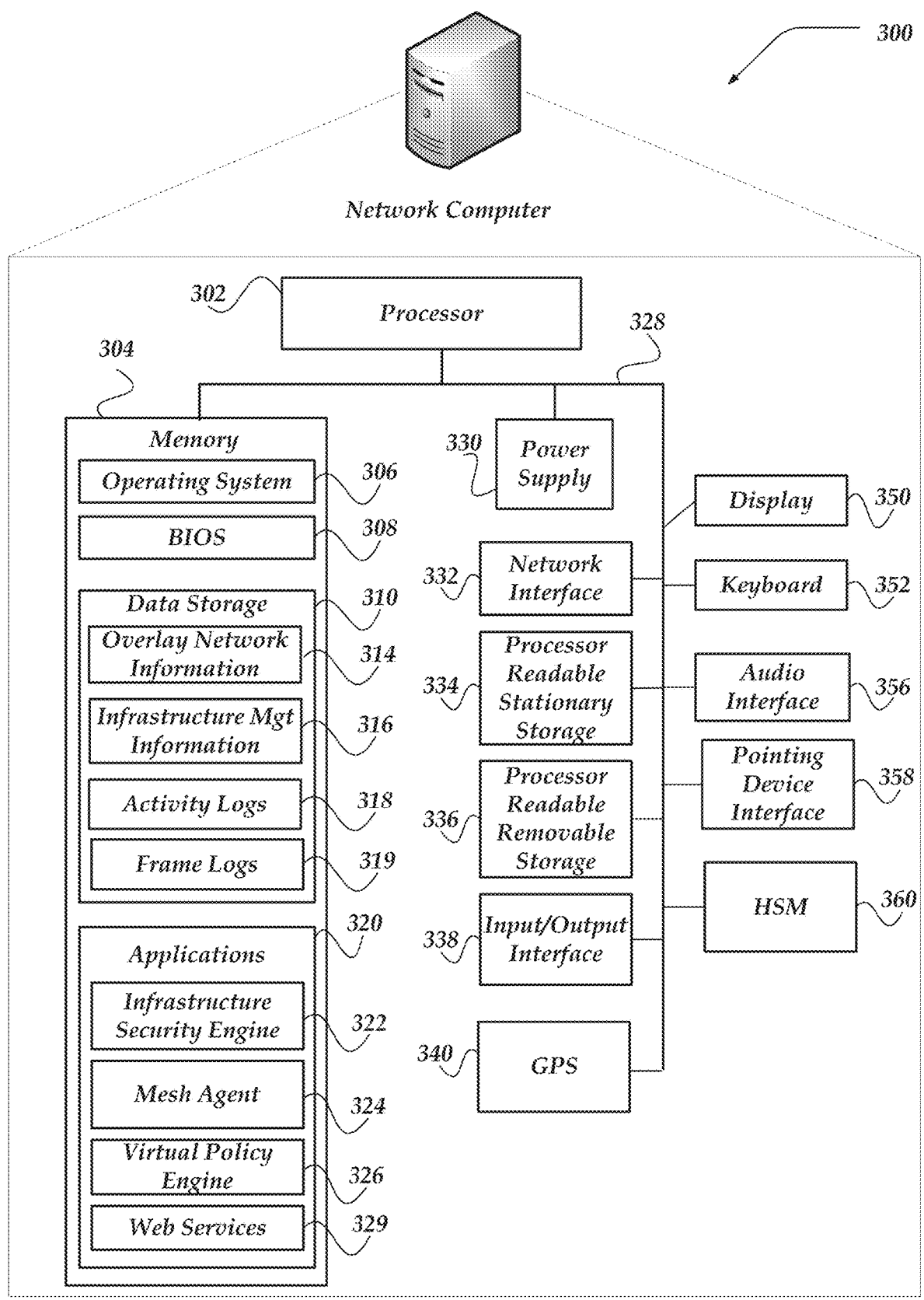
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, virtual policy engine 326, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, infrastructure management information 316, activity logs 318, frame capture logs 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, virtual policy engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, virtual policy engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, virtual policy engine 326, web services 329, or the like, may be provisioned and de-commissioned automatically.

Also, in one or more of the various embodiments, infrastructure security 322, mesh agent 324, virtual policy engine 326, web services 329, or the like, may be located in virtual servers running in a cloud-based computing environment rather than being tied to one or more specific physical network computers. Likewise, in some embodiments, one or more of infrastructure security engine 322, mesh agent 324, virtual policy engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
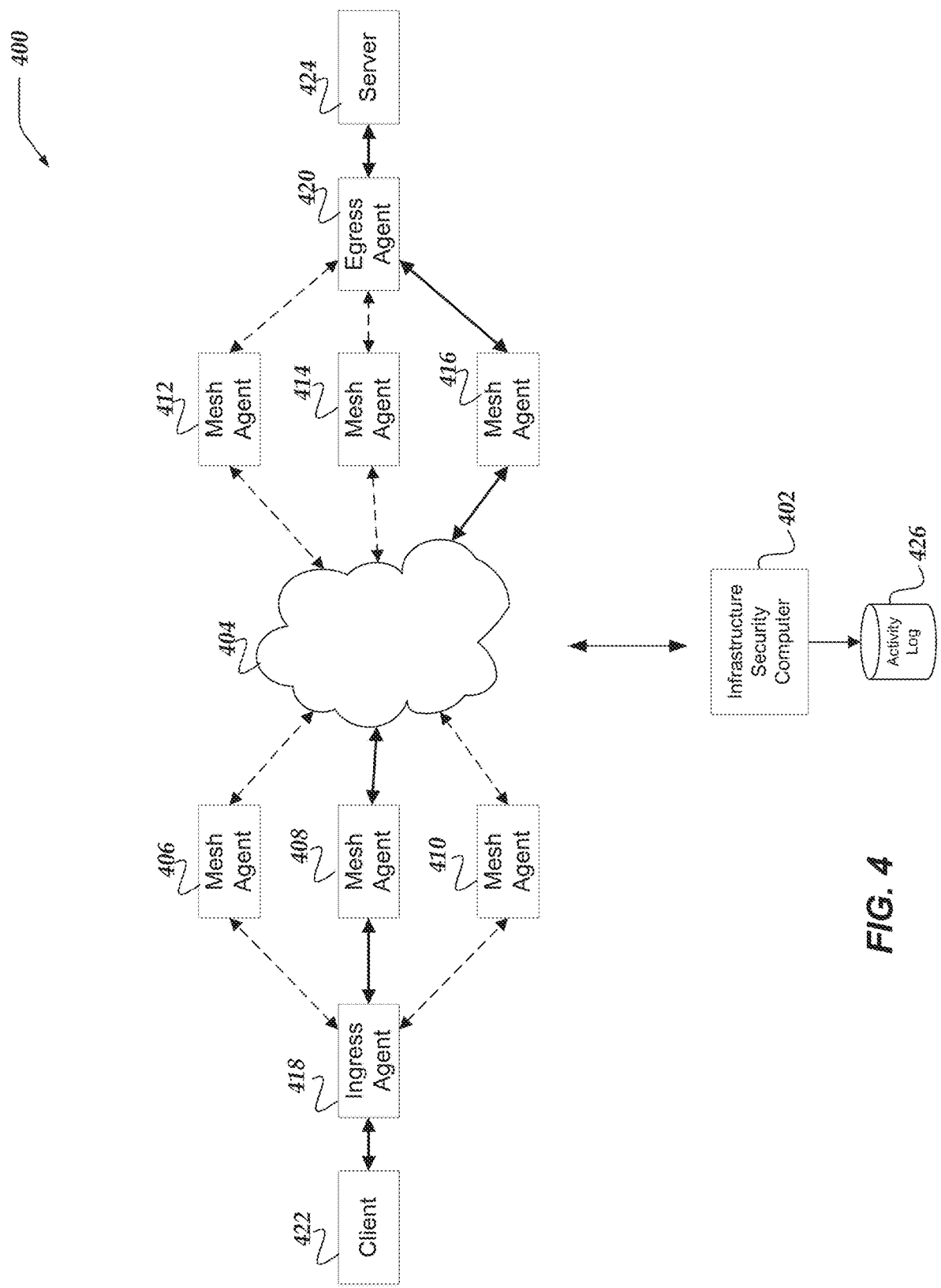
FIG. 4 illustrates a logical architecture of a system for identity and activity based network security policies in accordance with one or more of the various embodiments.

FIG. 4 illustrates a logical architecture of system 400 for identity and activity based network security policies in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce a secure overlay network that provides managed access to one or more resources (or endpoints) in a networked environment.

In one or more of the various embodiments, if a client employs a mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths or secure tunnels that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may associated with the communication through the secure tunnel. In this example, for some embodiments, activity log data store 426 represents a data store for storing logged or recorded activity for a managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Figure 5:
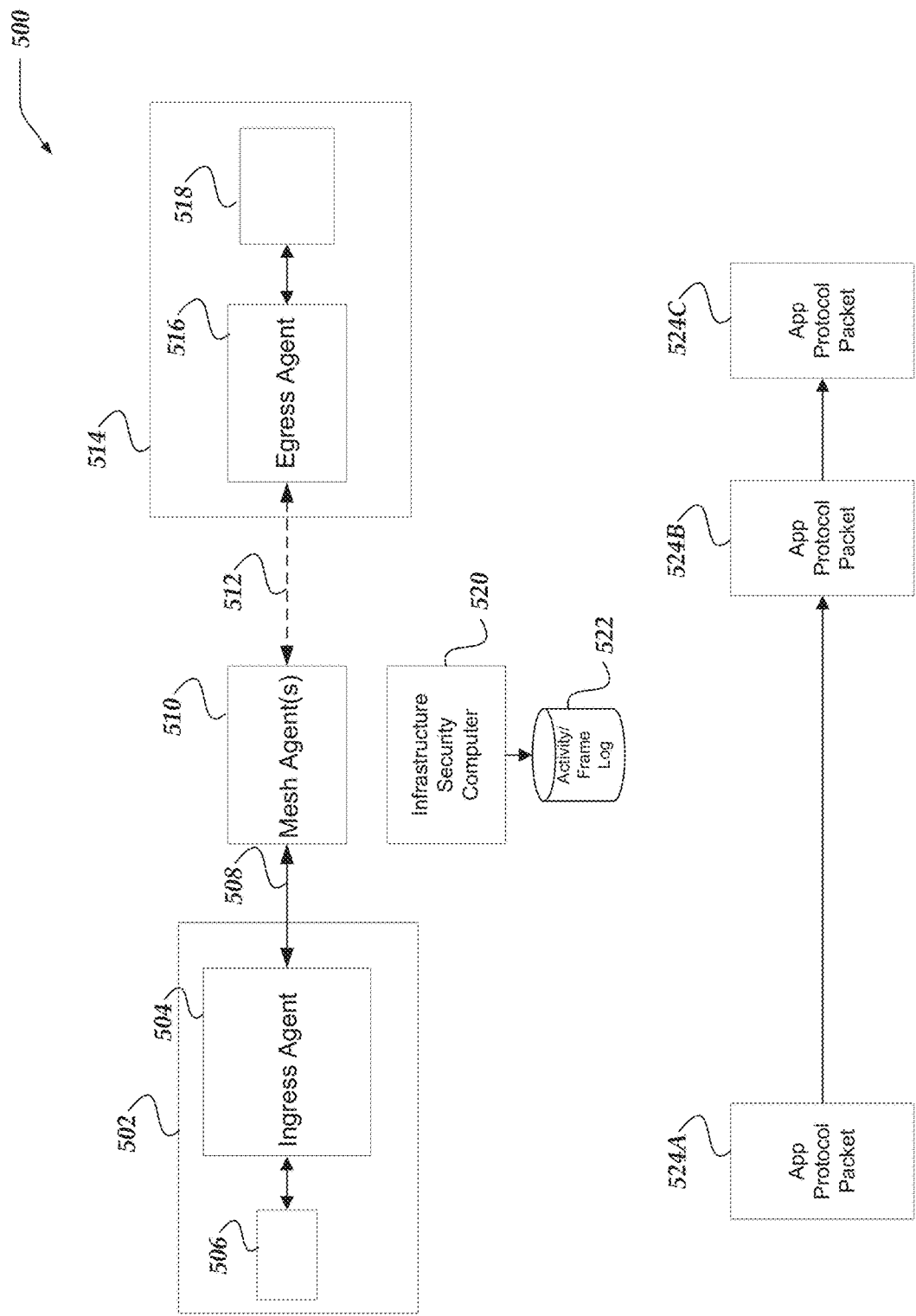
FIG. 5 illustrates a logical schematic of a system for identity and activity based network security policies in secured networks in accordance with one or more of the various embodiments.

FIG. 5 illustrates a logical schematic of system 500 for identity and activity based network security policies in secured networks in accordance with one or more of the various embodiments. in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as, client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to act as an endpoint to the connection from the client application.

In this example, for some embodiments, application protocol packet 524A represents one or more packets of network traffic that may be sent from a client application, such as client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet represents application protocol packets sent from an egress agent to the target resource server.

In one or more of the various embodiments, mesh agents including ingress agents or egress agents may be arranged to re-write application protocol packets to enforce one or more policies in the overlay network. For example, if an application protocol defines one or more fields for holding credential information, a policy may be provided such that egress agents may be arranged to insert the appropriate credential information into the application protocol packets before communicating them to the target resource server. Thus, in some embodiments, credential information provided by the client (if any) may be automatically replaced by other credential information determined by the egress agent as directed by its infrastructure security computer.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represents a modified packet that includes credential information as well as other packet modifications that may be required for a particular application protocol or credential mechanism.

Figure 6:
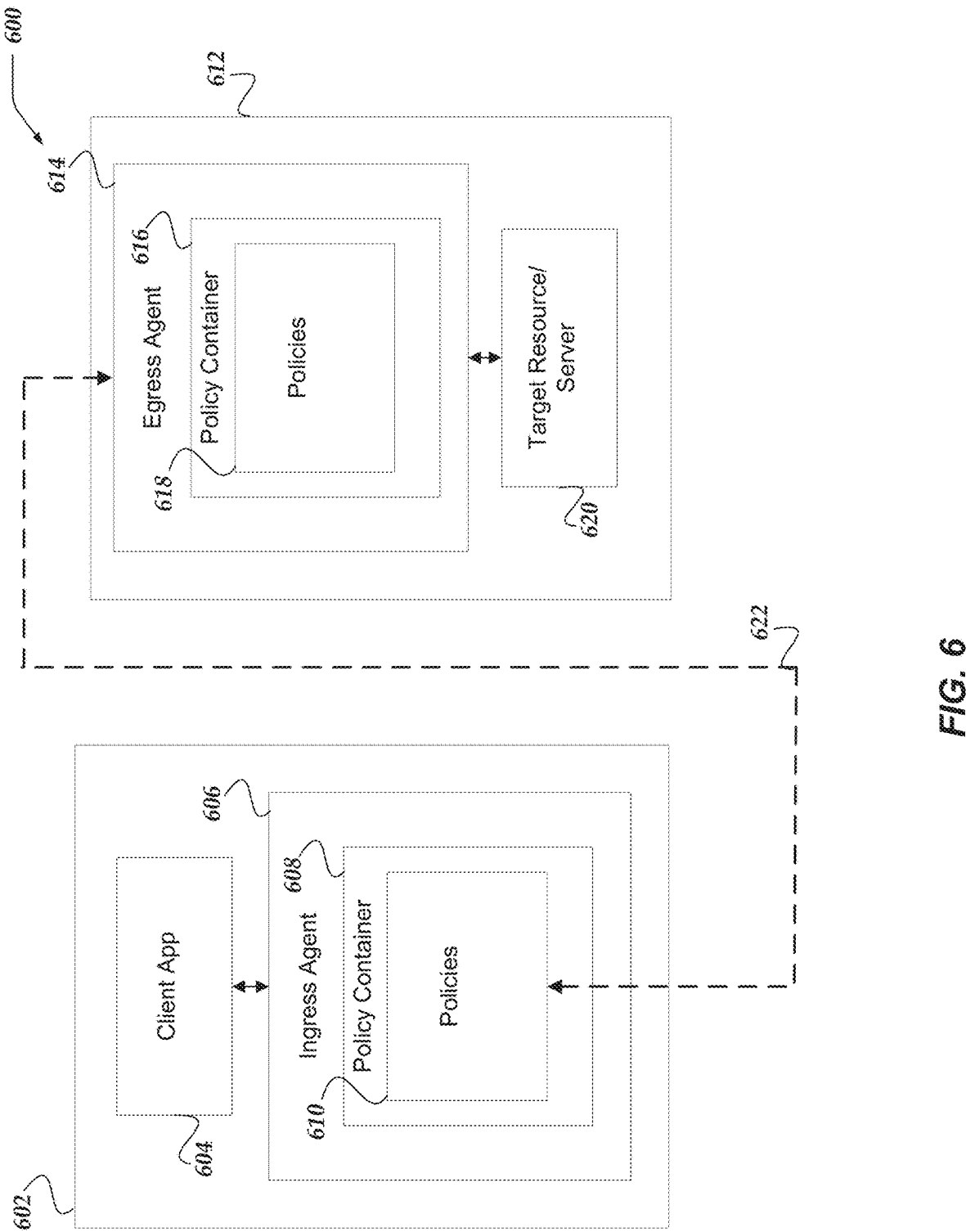
FIG. 6 illustrates a logical schematic of a system for identity and activity based network security policies in accordance with one or more of the various embodiments.

FIG. 6 illustrates a logical schematic of system 600 for identity and activity based network security policies in accordance with one or more of the various embodiments. In some embodiments, systems, such as, system 600 may include client computer 602, client application 604, ingress agent 606, policy container 608, policies 610, network computer 612, egress agent 614, policy container 616, policies 618, target resource server 620, or the like. Further, in this example, path 622 represents a network connection between client computer 602 and network computer 612 as facilitated by ingress agent 606 and egress agent 614.

As described above, in one or more of the various embodiments, ingress agents and egress agents may be arranged to establish a secure network path between a client application, such as, client application 604 and target resources, such as, target resource 620.

As described above, mesh agents, including, ingress agents or egress agents may be enabled to inspect or modify network traffic exchanged between client applications and protected target resources. Accordingly, in some embodiments, mesh agents may be arranged to employ one or more policies included in policy containers that may include rules, instructions, parsers, grammars, or the like, directed to one or more application protocols that particular client applications and target resources may employ to communicate.

Herein, for brevity and clarity, network traffic, such as, traffic over connection 622 may be referred to as requests or responses such that clients may send/provide requests and target resources may send/provide responses. One of ordinary skill in the art will appreciate that the requests or responses may be part of ongoing/continuous sessions rather than being limited to strict one-for-one exchanges of requests and responses. For example, policies may be applied to data packets that comprise streaming video, streaming data, streaming audio, or the like.

In one or more of the various embodiments, particular policies for particular application protocols may be included in policy containers, such as, policy container 608 and policy container 616. In some embodiments, policy containers may be arranged to include one or more policies that declare access rules for one or more resources or network segments.

In some embodiments, policy containers may be associated with one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

Figure 7:
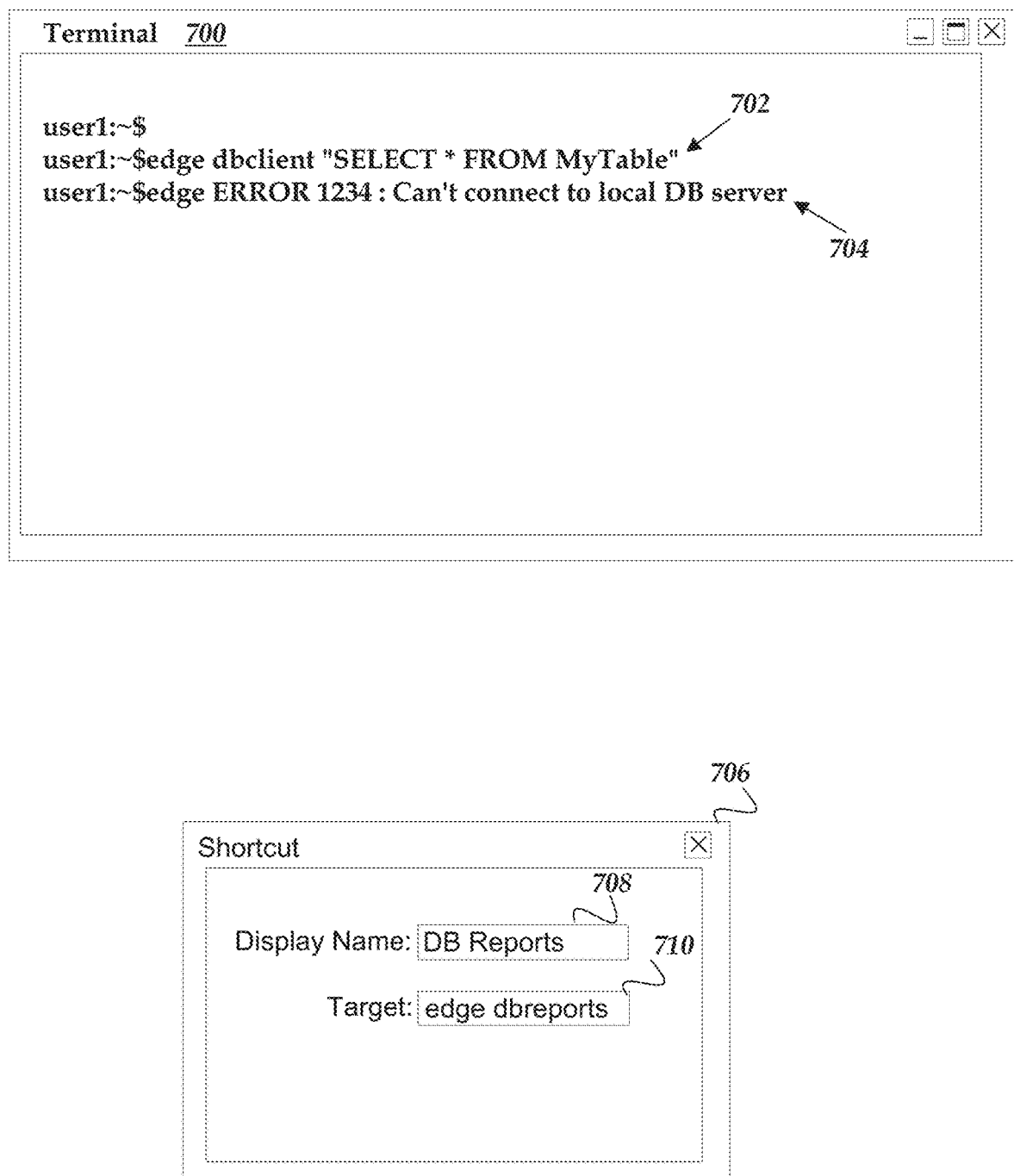
FIG. 7 illustrates a logical schematic of a terminal and shortcut 706 for managing and monitoring endpoint activity in secured networks in accordance with one or more of the various embodiments.

FIG. 7 illustrates a logical schematic of terminal 700 and shortcut 706 for identity and activity based network security policies in accordance with one or more of the various embodiments. In some embodiments, terminal 700 may represent a computer terminal application that enables users access to command-line interfaces for various applications. In this example, for some embodiments, command line 702 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 706 illustrates how a shortcut for a GUI based operating system or window manager may be configured to route commands initiated from a desktop (e.g., mouse-clicks) through secure tunnels in the overlay network. In this example, shortcut 706 includes an application display name, such as, display name 708 and a launch/execution command represented by target 710. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 8:
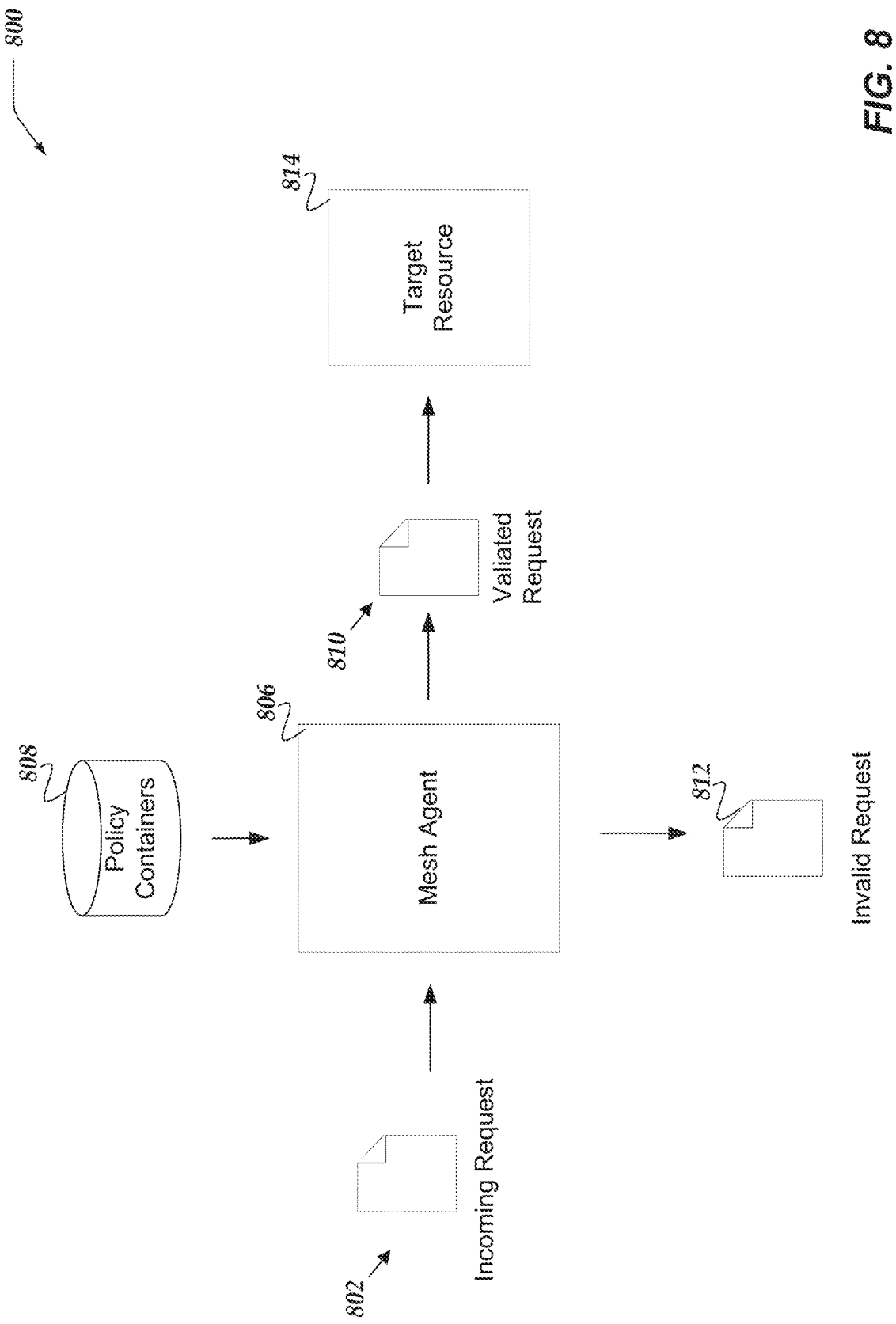
FIG. 8 illustrates a logical schematic of a system for identity and activity based network security policies in accordance with one or more of the various embodiments.

FIG. 8 illustrates a logical schematic of system 800 for identity and activity based network security policies in accordance with one or more of the various embodiments. As described above, in some embodiments, client requests, such as, client request 802 may be provided to mesh agents, such as, mesh agent 806. Accordingly, in some embodiments, mesh agents may be arranged to apply one or more policies included in policy containers, such as, policy containers 808 to validate if the request may be forwarded to a next mesh agent in the secure tunnel (not shown) or to the ultimate destination, such as target resource 814.

Also, in some embodiments, if the request may be invalidated based on one or more policies, the request may be rejected or discarded as represented by invalid request 812.

In some embodiments, policies may be declared the perform other actions, such as generating notifications, collecting metrics, activity logging, data masking, data substitution, or the like, rather than being limited to validating/invalidating requests or responses. Accordingly, in some embodiments, some policies may pass through modified requests/responses.

Figure 9:
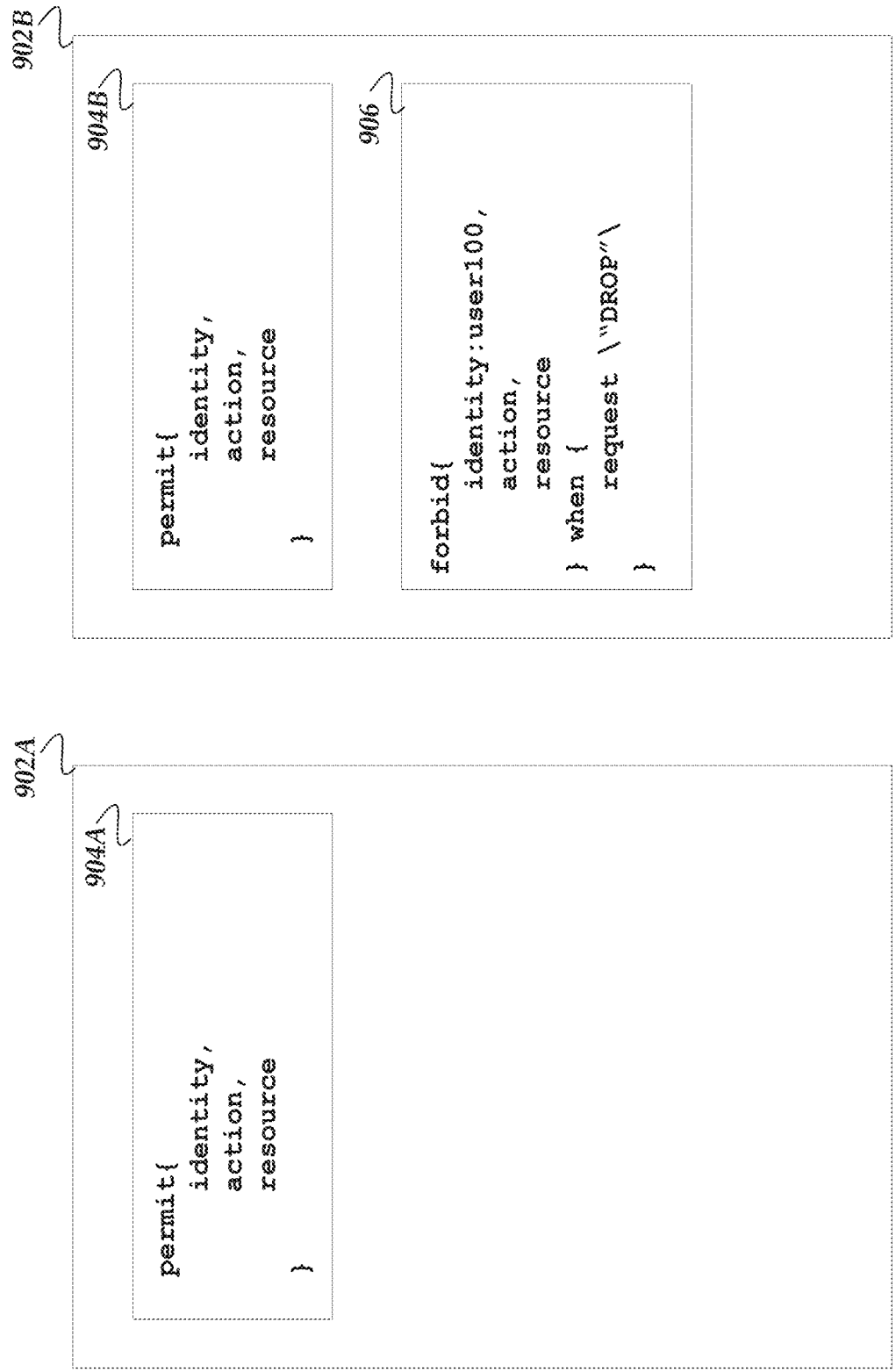
FIG. 9 illustrates a logical schematic of a policy container for identity and activity based network security policies in accordance with one or more of the various embodiments.

FIG. 9 illustrates a logical schematic of a policy container for identity and activity based network security policies in accordance with one or more of the various embodiments. As discussed herein, in some embodiments, mesh agents may be arranged to apply one or more policies to evaluate requests or responses that may be flowing through an overlay network. In some embodiments, policies may be grouped or included in policy containers. Accordingly, in some embodiments, each policy container may include one or more policies that may be applied to requests or responses. Note, generally these innovations may be applied in either direction of a communication flow depending on the policy configuration. Accordingly, in some cases, for brevity, a feature of these innovations may be described in terms of a request or a response. In such cases, one of ordinary skill in the art may assume that the feature may be applied to requests or responses unless it is clear from the supporting language that a feature exclusively applies to one (e.g., a request) and not the other.

Similarly, in some embodiments, policies may be declared the perform other actions, such as generating notifications, collecting metrics, activity logging, data masking, data substitution, or the like, rather than being limited to validating/invalidating requests or responses. Accordingly, in some embodiments, some policies may pass through modified requests/responses.

In some embodiments, infrastructure security engines may update one or more policy containers. Such updates may include adding policies, removing policies, or updated policies that may be associated with policy containers. Also, in some embodiments, infrastructure security engines may be arranged to provide additional policy containers. In some embodiments, if a policy container may be updated, infrastructure security engines may be arranged to distribute the updated policy containers to the mesh agents that comprise the overlay network.

In some embodiments, policy containers may be updated while a secure session between a client and resource may be active. Accordingly, in some embodiments, policy enforcement at the mesh agents in overlay networks may be modified in real-time without interaction with the client or interaction with the target resource.

In one or more of the various embodiments, policy containers may be associated with one or more activities that may include applications, application protocols, resource types, application types, or the like. In some embodiments, infrastructure security engines may be arranged to maintain an index, map, dictionary, or the like, that associate policy containers with one or more activities.

Also, in some embodiments, infrastructure security engines may be arranged to support one or more policy description languages to define policies included in policy containers. In some cases, these policy description languages may be conventional or standard policy description languages. Also, in some embodiments, infrastructure security engines may be arranged to support one or more custom policy description languages. In some embodiments, infrastructure security engines may be arranged to support policies defined using general purpose computer languages, such as, Go, Javascript, Python, C, C++, Rust, or the like. Accordingly, in some embodiments, infrastructure security engines may be arranged to employ grammars, parsers, libraries, instructions, or the like, provided or declared in configuration information to interpret policy description languages to account for local requirements or local circumstances.

In this example, for some embodiments, policy container 902A represents a policy container that includes policy 904A. In this example, it may be assumed that policy container 902A is associated with an activity such as actions performed by an application or application protocol that may be operative or available in the overlay network.

In this example, policy container 902A may be assumed to evaluate requests directed to one or more particular applications or one or more particular application protocols. Accordingly, in this example, policies, such as policy 904A may be employed to evaluate such requests or responses. In this example, for some embodiments, policy 904A represents a policy that enables requests or responses associated with any identity or any actions to be considered validated.

In response to an infrastructure security engine updating policy container 902A, infrastructure security engines may distribute the updated policy containers to mesh agents that comprise the overlay network. In this example, policy container 902B may represent the updated policy container and policy 904B may be considered to represent the same policy as policy 904A (here assuming it was not changed by the update to the policy container). Accordingly, in this example, policy 906 represents a policy that was added to policy container 902A to create policy container 902B. In this example, policy 906 may be considered to reject requests from entities corresponding to identity user 100 if the request payload includes a word or string that matches the pattern "DROP" such as DROP TABLE, DROP INDEX, DROP USER, and so on. For example, if policy container 902A/902B is mapped to database activities, the entity (e.g., user or service) associated with identity user 100 may be barred from issuing SQL commands that may result in database objects (e.g., tables, indexes, or the like) being deleted from the target resource (e.g., a database server).

Generalized Operations

FIGS. 10-13 represent generalized operations for identity and activity based network security policies in accordance with one or more of the various embodiments. In one or more of the various embodiments, processes 1000, 1100, 1200, and 1300 described in conjunction with FIGS. 10-13 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 10-13 may be used for identity and activity based network security policies in accordance with at least one of the various embodiments or architectures such as those described in conjunction with FIGS. 4-9 Further, in one or more of the various embodiments, some or all of the actions performed by processes 1000, 1100, 1200, and 1300 may be executed in part by infrastructure security engine 322, virtual policy engine 326, one or more mesh agents, such as, mesh agent 324, or the like, running on one or more processors of one or more network computers.

Figure 10:
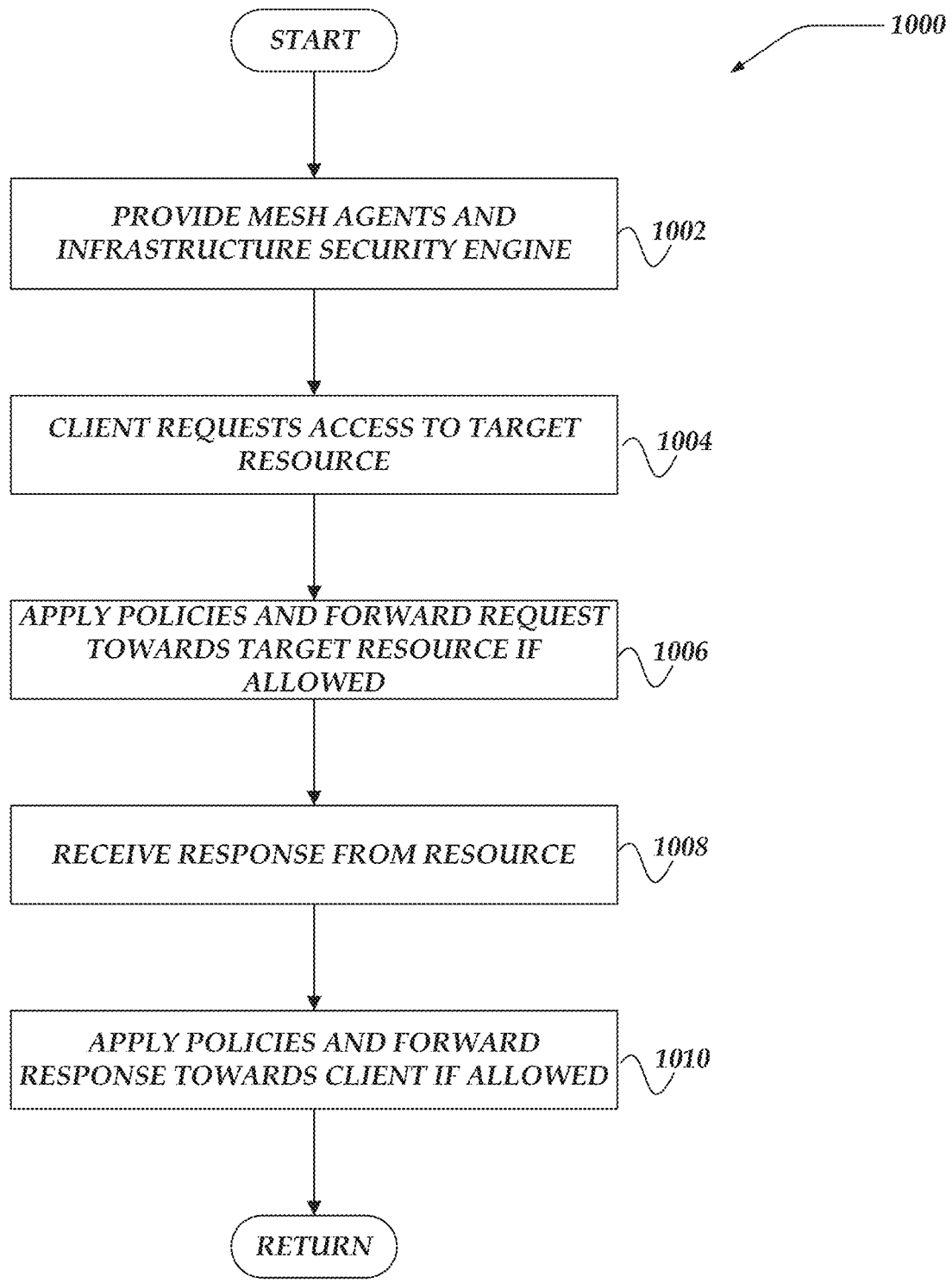
FIG. 10 illustrates an overview flowchart of a process for identity and activity based network security policies in accordance with one or more of the various embodiments.

FIG. 10 illustrates an overview flowchart of process 1000 for identity and activity based network security policies in accordance with one or more of the various embodiments. After a start block, at block 1002, in one or more of the various embodiments, one or more mesh agents and one or more infrastructure security engines may be provided. As described above, mesh agents may be deployed in an underlay network where an infrastructure security computer may be arranged to dynamically configure the mesh agents to establish an overlay network.

At block 1004, in one or more of the various embodiments, clients may request access to a target resource. In some embodiments, client applications may be configured to send requests that may be routed via mesh agents to the target resource. In some embodiments, the mesh agent that may be directly communicated to by the client may be considered to be an ingress agent for the session because it enables the client to access the overlay network.

At block 1006, in one or more of the various embodiments, mesh agents may be arranged to apply one or more policies before the request may be forwarded towards the target resource if allowed by the relevant policies. As described above, infrastructure security computers may be arranged to promulgate policy information by pushing policy containers to mesh agents to enforce the policies of the overlay network. In some embodiments, these policies may be enforced irrespective of how the target resource may be configured. For example, if a target resource is configured to support request-type A, a policy enforced in the overlay network may block or restrict request-type A requests. For example, if a database is enabled to allow remote users to drop tables, the overlay network may enforce a policy that disables remote users from dropping tables.

At block 1008, in one or more of the various embodiments, mesh agents may be arranged to receive responses from the target resource. Similar to how clients access the overlay network, resources responding to requests may also be configured to respond via the overlay network. Accordingly, in some embodiments, target resources may communicate responses to mesh agents that enable access to a secure tunnel to the client provided by the overlay network. Note, the mesh agent that enables resources to respond to requests may be referred to as egress agents since from the point-of-view of the client, the egress agent is the mesh agent at the end of the secure tunnel that directly communicates with the target resource.

At block 1010, in one or more of the various embodiments, mesh agents may be arranged to apply one or more policies and forward responses towards the clients, if allowed by the relevant policies. Responses may be forwarded to a sequence of mesh agents that form a secure tunnel between the ingress agent and the egress agent associated with the tunnel. Each intervening mesh agent as well as the ingress agent and egress agent may enforce one or more policies in the overlay network.

Next, in one or more of the various embodiments, control may be returned to a calling process.

Figure 11:
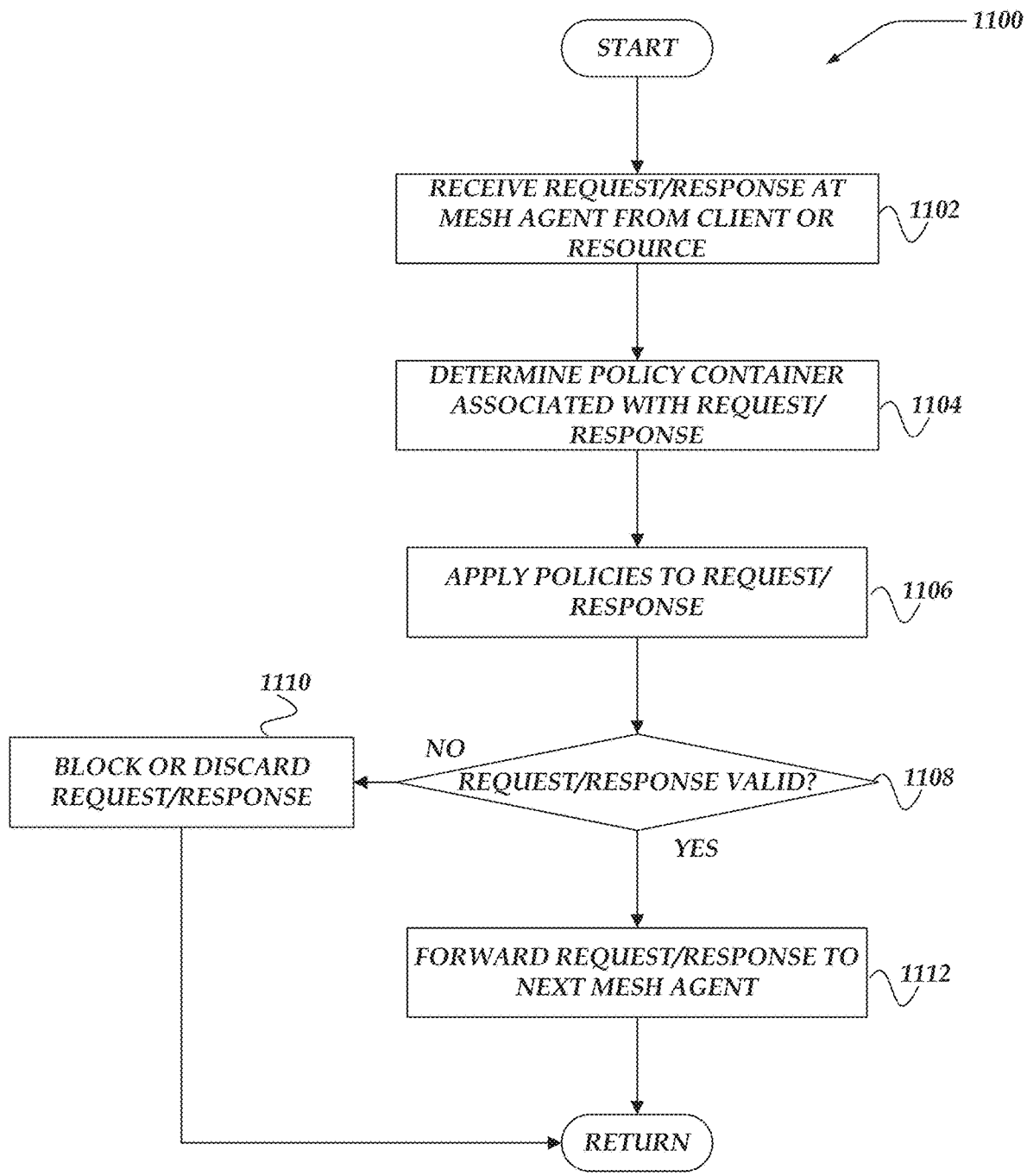
FIG. 11 illustrates a flowchart of a process for identity and activity based network security policies in accordance with one or more of the various embodiments.

FIG. 11 illustrates a flowchart of process 1100 for identity and activity based network security policies in accordance with one or more of the various embodiments. After a start block, at block 1102, in one or more of the various embodiments, mesh agents may be arranged to receive a request from a client or a response from a resource. In some embodiments, infrastructure security computers may provide route information for a secure tunnel in the overlay network between a client and a target resource. In some embodiments, the secure tunnel may be comprised of two or more mesh agents.

At block 1104, in one or more of the various embodiments, mesh agents may be arranged to determine one or more policy containers that may be associated with the request or response. In some embodiments, infrastructure security computers may be arranged to associate particular activities that may correspond to applications, application protocols, originating endpoints, resources, or the like, with one or more policy containers. For example, in some embodiments, a particular policy container may be associated with outbound HTTP traffic. Likewise, for example, another policy container may be associated with network traffic/connections to a particular database server. In some cases, a request or response may be associated with more than one policy container. For example, a request from a using a particular application protocol may be associated with a policy container for the application protocol and another policy container for the server type (e.g., web-server, database, or the like). For example, an HTTP associated policy container may include policies that block or restrict HTTP traffic from particular servers/web-sites. While a policy container associated with the underlying application may include polices that may block or restrict requests or responses that include certain SQL expressions.

At block 1106, in one or more of the various embodiments, mesh agents may be arranged to apply the one or more policies to the request/response.

In one or more of the various embodiments, policy containers may include one or more policies that include rules, instructions, or the like, for implementing a particular policy. In some cases, policies may conform to one or more standard or customized policy description languages.

In one or more of the various embodiments, policies included in policy containers may be associated with one or more actions or one or more identities. In some embodiments, actions of interest for a policy may be declared within the policy itself using a policy description language. In some cases, policy containers may include a map, dictionary, or the like, that may explicitly associate one or more policies with one or more actions.

In some embodiments, actions may be associated with applications. For example, particular SQL expressions may be considered actions that may be directed towards SQL databases.

In some embodiments, identities may represent users, services, machines, or the like, that the actions may be directed by or performed on behalf-of. As described above, infrastructure security computers may be arranged to assign identities to the entities (e.g., users, services, machines, or the like) that may be enabled to access overlay networks. Accordingly, in some embodiments, identities may be assigned or determined by an infrastructure security computer if a client is requesting access to a protected resource.

At decision block 1108, in one or more of the various embodiments, if the request or response may be determined to be valid, control may flow to block 1112; otherwise, control may flow to block 1110. In some embodiments, mesh agents may execute the one or more policies that may apply to the activity and identity associated with the request/response. In some embodiments, a policy may be configured to block or restrict requests/responses that do not conform to a policy. In some embodiments, if there may be two or more applicable policies, policies that block or restrict traffic may be enforced over other less restrictive policies. For example, in some cases, a first policy may be configured to mask sensitive fields in a response while a second policy may be configured to block the response. Accordingly, in this example, the mesh agent that may be applying the policies may block or restrict the response.

In some embodiments, if policy containers include multiple policies, the policies may be associated with priority values that may be used to determine priority ranking of the policies. Also, in some embodiments, mesh agents may be arranged to prioritize policies based on the order they appear in a policy container.

At block 1110, in one or more of the various embodiments, mesh agents may be arranged to block or discard the request or response. As described, in some embodiments, policies may be defined to perform a variety of actions, including validating or rejecting requests or responses. Accordingly, for brevity and clarity the innovations herein are generally described in terms of the policies validating requests/responses. However, one of ordinary skill in the art will appreciate that policies are not limited to validating requests/responses and may perform other actions, such as, data substitution, data masking, sending notification, raising alerts, collecting metrics, or the like.

At block 1112, in one or more of the various embodiments, mesh agents may be arranged to forward the request or response to the next mesh agent. As described above, in some embodiments, mesh agents may establish a secure tunnel that "hops" from one mesh agent to another mesh agent to connect the ingress agent and the egress agent. Accordingly, in some embodiments, some or all mesh agents that comprise the secure tunnel may similarly enforce one or more policies in the overlay network.

Next, in one or more of the various embodiments, control may be returned to a calling process.

Figure 12:
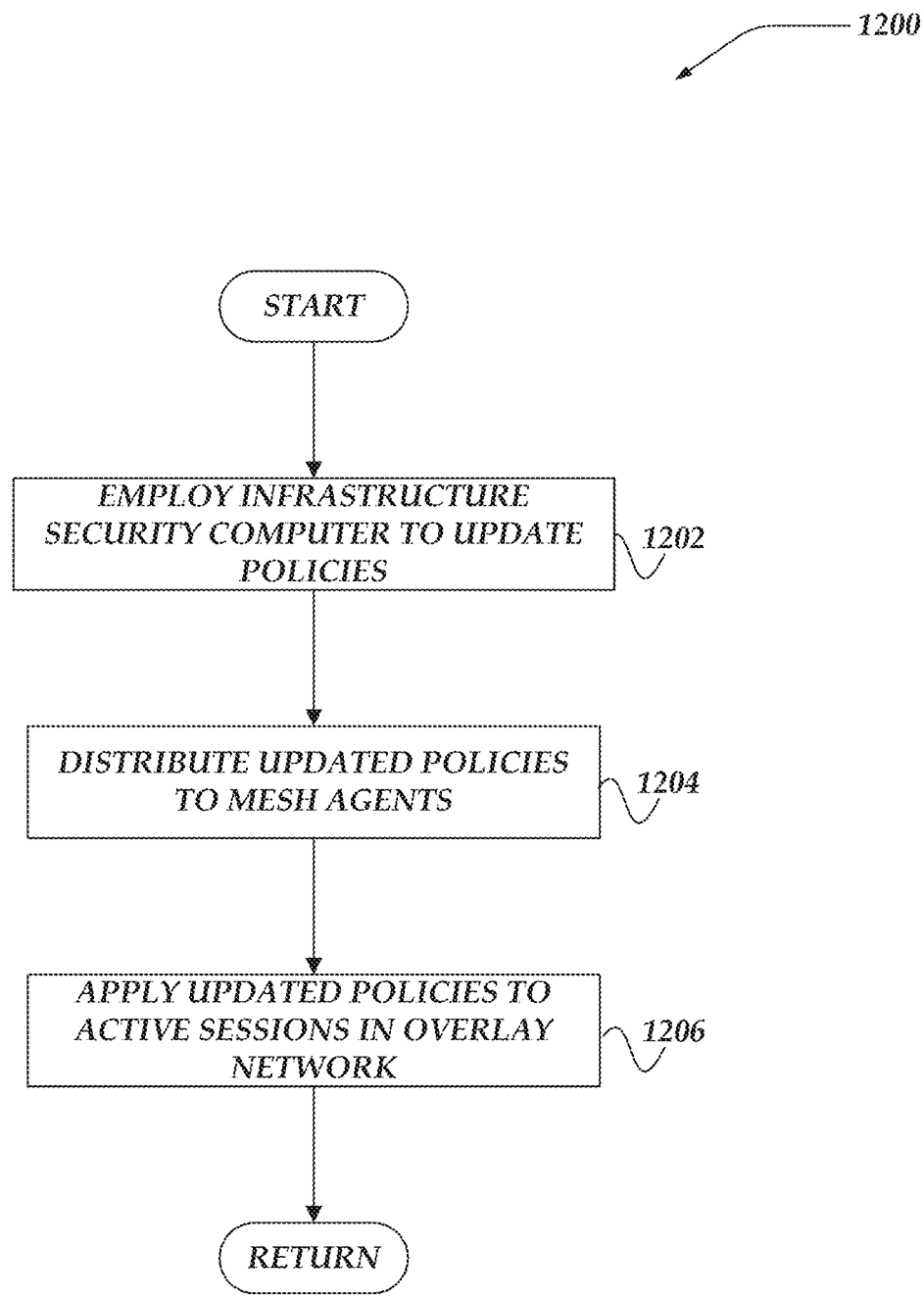
FIG. 12 illustrates a flowchart of a process for identity and activity based network security policies in accordance with one or more of the various embodiments.

FIG. 12 illustrates a flowchart of process 1200 for identity and activity based network security policies in accordance with one or more of the various embodiments. After a start block, at block 1202, in one or more of the various embodiments, infrastructure security engine may be arranged to update one or more policies. In some embodiments, infrastructure security computer may be arranged to provide one or more user interfaces that enable administrators to observe/monitor one or more metrics associated with activity in the overlay network. In some embodiments, this may include monitoring some or all of the network traffic that may be flowing through secure tunnels in the overlay network. For example, in some embodiments, a user interface may be arranged to display real-time information from active sessions (e.g., client/resource pairs). For example, in some embodiments, a user interface may display a dynamic list of clients and the resources they may be communicating with. Accordingly, in some embodiments, the user interface may enable administrators to interactively view the policy container(s) that may be associated with each secure tunnel or session in the overlay network.

In one or more of the various embodiments, such user interfaces may enable administrators to modify or update one or more policies in the policy containers. In some cases, such user interfaces may enable administrators to enter or modify policies by changing or adding policies using a policy description language. In other cases, in some embodiments, user interfaces may be arranged to enable administrators to modify policies by manipulating graphic user interface controls, such as, buttons, sliders, check boxes, text fields, or the like, such that the user interface interactions may be mapped to policy description language expressions that may include included in policy containers.

At block 1204, in one or more of the various embodiments, infrastructure security engines may be arranged to distribute the updated policy containers to the one or more mesh agents in the overlay network.

In one or more of the various embodiments, policy containers and the included policies may be stored in a data store that is part of or otherwise managed by the infrastructure security computer. Accordingly, infrastructure security computers may be arranged to publish the updated policy containers to mesh agents in the overlay network. In some cases, for some embodiments, modified policy containers may be automatically pushed to each mesh agent included in the overlay network. In other cases, for some embodiments, infrastructure security computers may be configured to selectively push the modified policy containers to one or more mesh agents in the overlay network.

Note, in some embodiments, pushing updated policy containers or policies to mesh agents may not interfere with the existing/active sessions unless the updated policy containers may be associated with activities being conducted in a session.

At block 1206, in one or more of the various embodiments, mesh agents may be arranged to apply the updated policies to active sessions in the overlay network. In some embodiments, if mesh agents may be provided updated policy containers, the mesh agents may be arranged to determine if one or more of the active sessions (secure tunnels) performing activities may be associated with the updated policy containers. Accordingly, in some embodiments, if a match may be found, the mesh agent may immediately apply or enforce the policies included in the updated policy container. Also, in some embodiments, mesh agents may be arranged to update their local collection of policy containers and begin immediately applying them to traffic passing through secure tunnels that runs through the mesh agent.

For example, in some embodiments, a client in an overlay network may establish a session to a website/website and begin exchanging requests/responses. If in this example, the website may be observed sending restricted content to the client, an administrator may modify the policy container for HTTP protocol by adding a policy that blocks the restricted content. Thus, in this example, the infrastructure security computer may push the updated policy container to the mesh agents in the overlay network resulting in the restricted content being blocked without terminating the secure tunnel or the HTTP session.

Next, in one or more of the various embodiments, control may be returned to a calling process.

Figure 13:
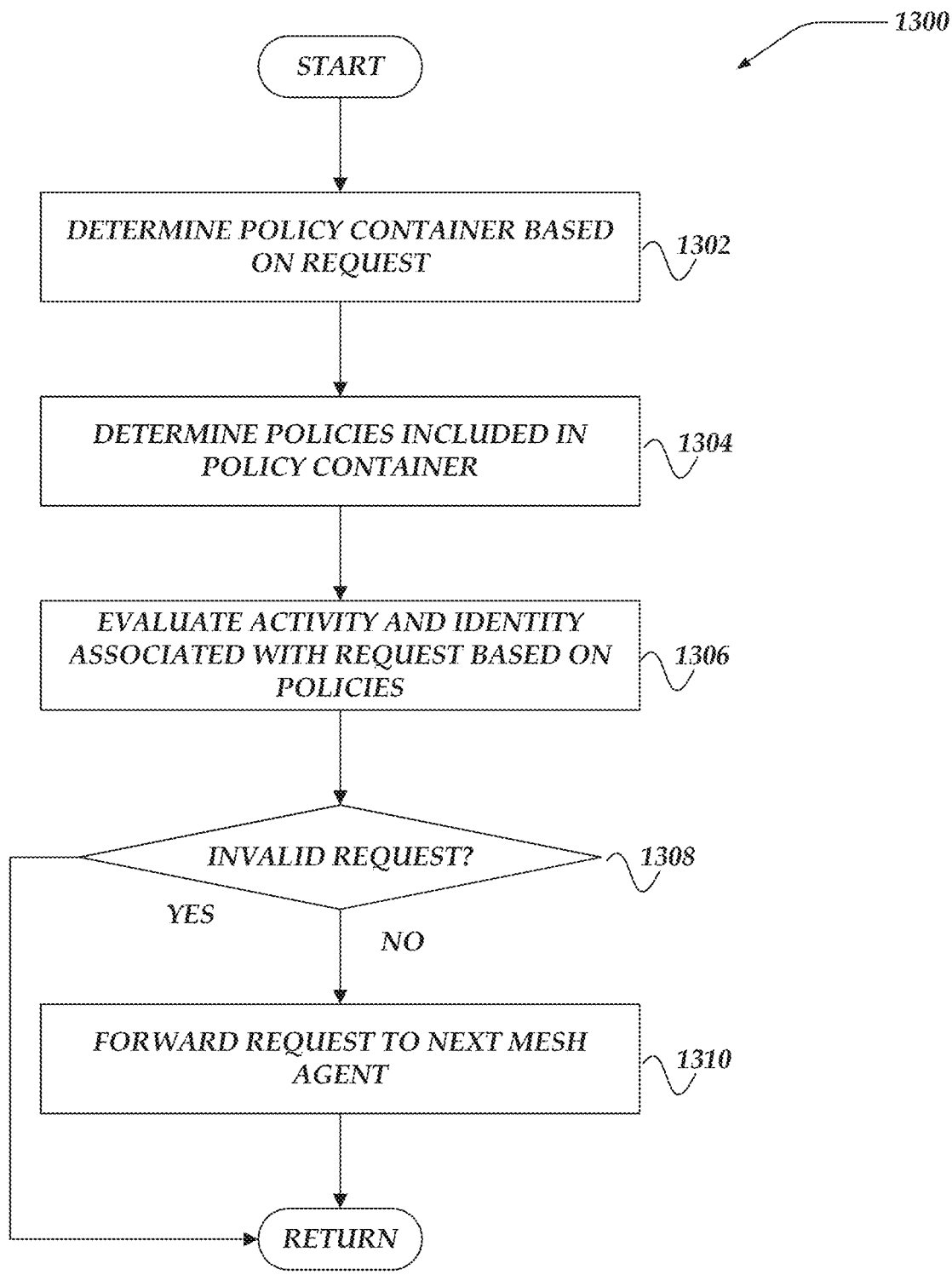
FIG. 13 illustrates a flowchart of a process for identity and activity based network security policies in accordance with one or more of the various embodiments.

FIG. 13 illustrates a flowchart of process 1300 for identity and activity based network security policies in accordance with one or more of the various embodiments. After a start block, at block 1302, in one or more of the various embodiments, mesh agents may be arranged to determine one or more policy containers based on the request. In some embodiments, if a client attempts to request access to a protected resource, the infrastructure security computer responsible for managing access in the overlay network may be arranged to authenticate the entity associated with request, determining an identity that may be correspond to the entity. Also, in some embodiments, if a client attempts to request access to a resource, the infrastructure security computer responsible for the overlay network may be arranged to determine the activity associated with the request. In some embodiments, infrastructure security computer may be arranged to determine the activity based on one or more the application protocol used by the request, an application named or otherwise associated with the request, the client making the request, or the like. Also, in some embodiments, infrastructure security computers may be arranged to inspect the contents of the request for a finer grained determination of activities. For example, if the application protocol is RDP (remote desktop protocol), the infrastructure security computer may be arranged to look into the RDP payload to determine a particular activity, such as editing a word-processor document.

In some embodiments, if the activity may be determined the mesh agent may be arranged to determine if its collection of policy containers includes one or more policy containers that may be associated with the activity.

In one or more of the various embodiments, mesh agents may be arranged to locally store one or more policy containers that may be determined for a session. Also, in some embodiments, mesh agents may be arranged to obtain the relevant policy containers from the infrastructure security computer along with routing or authentication instructions provided by the infrastructure security computer if establishing a secure tunnel.

At block 1304, in one or more of the various embodiments, mesh agents may be arranged to determine one or more policies included in the policy containers. As described above, policy containers may be arranged to include one or more policies that the mesh agents may execute to enforce policy in the overlay network.

At block 1306, in one or more of the various embodiments, mesh agents may be arranged to evaluate the activity and identity associated with the request based on the one or more policies.

At decision block 1308, in one or more of the various embodiments, if the request may be invalid, control may be returned to a calling process; otherwise, control may flow to block 1310. Note, as described above, policies are not limited to validation or requests or responses. For example, in some embodiments, policies may be configured to modify the contents of requests or responses, generate alerts or notifications, collect metrics, or the like, rather than being limited to validating/invalidating requests or responses.

At block 1310, in one or more of the various embodiments, mesh agents may be arranged to forward the request to a next mesh agent. As described above, in some embodiments, mesh agent may be provided information from infrastructure security computer that declares a route or path through the overlay network that mesh agents may employ to determine the next mesh agent.

Next, in one or more of the various embodiments, control may be returned to a calling process.

Figure 14:
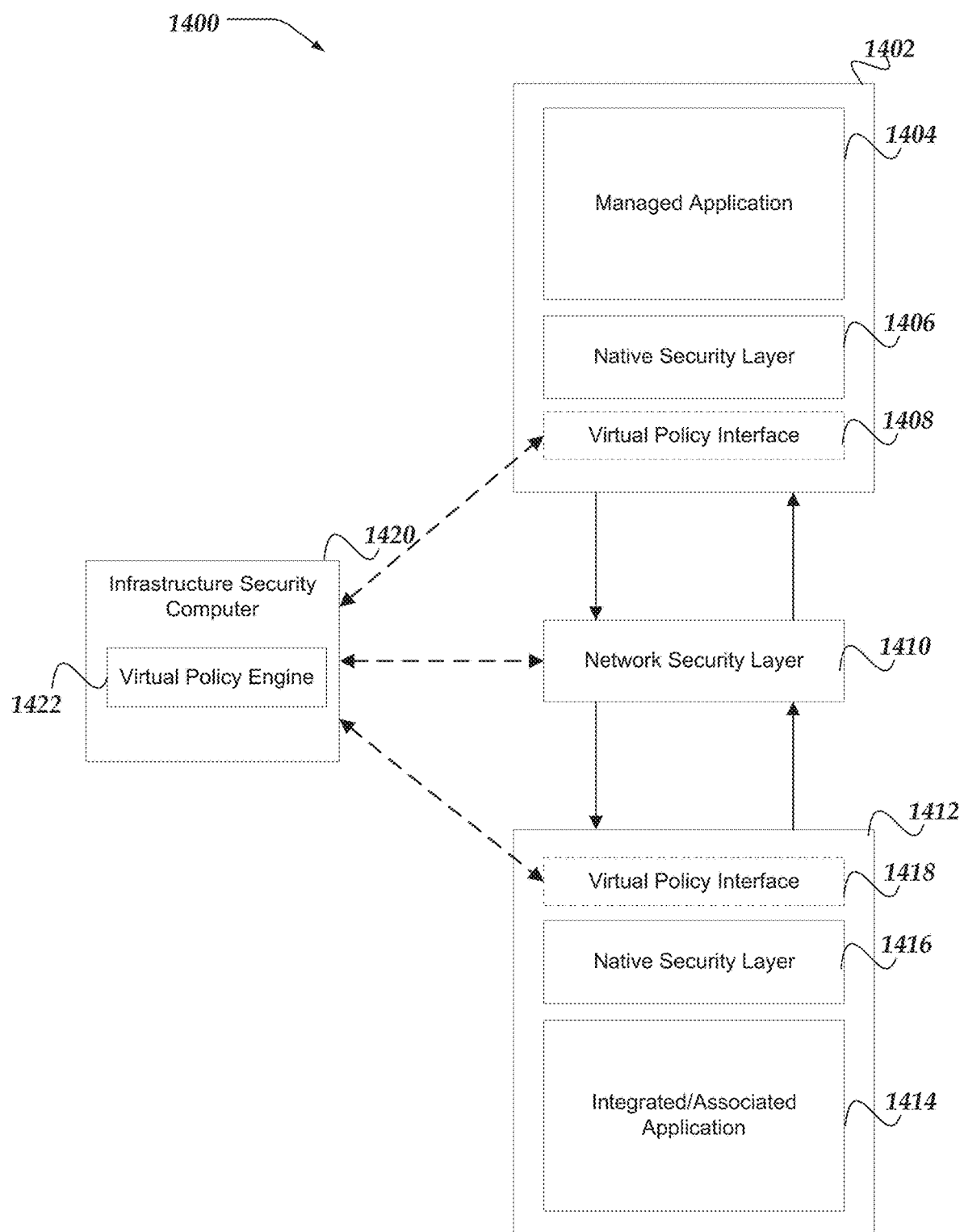
FIG. 14 illustrates a logical schematic of a system for virtualized permission and security enforcement in accordance with one or more of the various embodiments.

Illustrative Logical System Architecture for Virtualized Permission and Security Enforcement FIG. 14 illustrates a logical schematic of system 1400 for virtualized permission and security enforcement in accordance with one or more of the various embodiments. In some embodiments, security platforms may be arranged to provide organizations the flexibility to extend or adapt policy enforcement directed to applications used or hosted in their computing environments. As described above, in some embodiments, infrastructure security engines, ingress agents, egress agents, or the like, may enforce various policies based generally on endpoint-to-endpoint routing, activity monitoring, or the like. For example, in some embodiments, infrastructure security engines may be configured to enable or disable routing of requests or responses among various endpoints in protected networks based on at least identities or activities associated with the communications.

Also, in some embodiments, infrastructure security engines may be arranged to enforce or apply policies that may be associated with one or more application features or application privileges. In some embodiments, infrastructure security engines may be arranged to enable administrators to enforce additional restrictions or protections that may not be available on the managed applications. For example, in some embodiments, an application may offer a user role of "administrator" that organizations must assign to some employees to enable day-to-day operations or configuration maintenance for their applications. However, in this example, there may be many applications that grant excess privileges to such administrative roles such that they may be granted broad privileges, such as super-user privileges. Accordingly, in this example, organizations may be forced to grant some application administrators privileges that may be open ended or otherwise broader than necessary for administering the applications. Accordingly, an organization may desire to grant fewer administrative privileges to particular users rather than granting them all the privileges required for enabling administrative privileges for an application.

In some cases, some applications may provide fine-grained solutions for privilege management. However, in some embodiments, in some cases, the security models offered by applications may not match well with the security models preferred by the organizations using the applications. Similarly, in some cases, an organization's preferred security model associated with an application may evolve over time, particularly as that application may be provisioned to more users or more departments where there may be differing security requirements or security concerns. Also, in some embodiments, organizations that rely on privilege management features of applications may be required to ensure that personnel across the organization have the privileges and expertise to manage or maintain the security configuration for the different applications. In some cases, this may weaken overall security by distributing the over-privileged users across different departments or divisions. Also, in some cases, security of the organization's computing environments may be weakened because individual installations of the applications may require different security configurations that may be challenging to validate or maintain safely. For example, two departments may use the same application but due to different use cases, users or administrators from the different departments may require different application level security configurations (or different security models). Accordingly, in some embodiments, an organization would need to maintain the different security configurations for the same applications being used in different departments. This may result in increased administrative overhead, increased risk of malformed configurations, or the like. Also, in some embodiments, relying on applications to enforce security policies may be disadvantageous because subsequent application updates or application upgrades may include changes to the application security model or security configuration. Accordingly, in some cases, this may force organizations to expend increased resources to validate the application updates for security impacts as well as expend resources to manually re-configure each instance of the application as necessary.

Accordingly, in some embodiments, infrastructure security engines may be arranged to enable virtualized permission and security enforcement that may enable organizations to at once provide identity or activity based policy enforcement for individual applications or application instances across their organization. In some cases, for some embodiments, infrastructure security engines may be arranged to provide centralized security management for applications that may be distributed across organizations. Also, in some embodiments, infrastructure security engines may be arranged to enable organizations to grant or enforce privileges at an increased level of detail or scope that offered by the applications themselves.

In some embodiments, applications may be deployed to various hosts of an organization. In this example, for some embodiments, host 1402 represents a network computer, virtual machine, client computer, or the like, that may be hosting one or more applications, such as application 1404. In some embodiments, one or more applications, such as application may include a native security layer, such as native security layer 1406. In some embodiments, virtual policy interfaces, such as virtual policy interface 1408 may be generated for providing virtualized permission and security enforcement that may override or enhance the policies enabled or enforced by native security layers. Accordingly, in some embodiments, virtual policy interfaces may be arranged to enable organization-level administrators to grant particular privileges to application users that may be unsupported by the native security layer.

Also, in some embodiments, systems, such as system 1400 may include a network security layer that enforces permissions or privileges related to enabling applications or other endpoints in a protected network to communication. See, FIG. 4, FIG. 5, or the like, and accompanying descriptions for additional details about identity and activity based network security policies.

Further, in this example, host 1412 may represent one or more other hosts in the protected network. Accordingly, in this example, for some embodiments, host 1412 may host one or more applications, such as application 1414. In some cases, one or more applications, such as application 1414 may include a native security layer, such as native security layer 1416. Also, in some embodiments, virtual policy interfaces, such as virtual policy interface 1418 may be configured to enforce one or more security policies that may or may not be enforceable by native security layer 1416.

In some embodiments, infrastructure security computer 1420 may be configured to distribute policy information (e.g., security policy configuration information) to one or more of network security layer 1410, virtual policy interface 1406, virtual policy interface 1418, or the like. Accordingly, in some embodiments, infrastructure security computer may enable centralized security policy managements or security policy configuration. In some embodiments, infrastructure security computers may be configured to integrate with one or more security information systems, credential repositories, or the like, to enforce some or all security policies.

Also, in some embodiments, infrastructure security computers may be arranged to include virtual policy engines, such as virtual policy engine 1422 that may be arranged to for managing or enforcing one or more policies associated virtual policy interfaces. In some embodiments, infrastructure security engines may be arranged to include virtual policy engines or otherwise perform one or more operations to enforce virtual security policies.

However, in some embodiments, virtual policy interfaces may be configured to be independent of a responsible infrastructure security computer. Accordingly, in some embodiments, virtual policy interfaces may be arranged to enable local security policy management absent communication or other dependence on an infrastructure security computer. Thus, in some embodiments, virtual policy engines may be arranged to be located separate from infrastructure security computers, including being located directly on the computers hosting applications.

In some embodiments, virtual policy engines (or infrastructure security engines) may be arranged to dynamically generate virtual policy interfaces for collecting information associated with interactions directed to one or more applications. In some embodiments, generating virtual policy interfaces may include injecting interface code/instructions into applications. Also, in some embodiments, generating virtual policy interfaces may include instantiating virtual policy interfaces for collecting interaction information from various sources. Also, in some embodiments, generating virtual policy interfaces may include associating one or more existing virtual policy interfaces with one or more particular applications. For example, for some embodiments, virtual policy interfaces may be generated from cached or pooled resources that may include pre-generated or previously generated virtual policy interfaces.

In some embodiments, virtual policy interfaces may be generated concurrently with their associated applications. For example, applications that embed virtual policy interfaces directly into their executable programs may generate virtual policy interfaces upon being launched. Also, in some embodiments, virtual policy interfaces that may operate in processes that may be separate from their associated applications may be generated independently from application launches. For example, a generated virtual policy interface may be configured to monitor its operating environment to watch for associated applications or to watch for activity/interactions associated with its associated applications.

Figure 15:
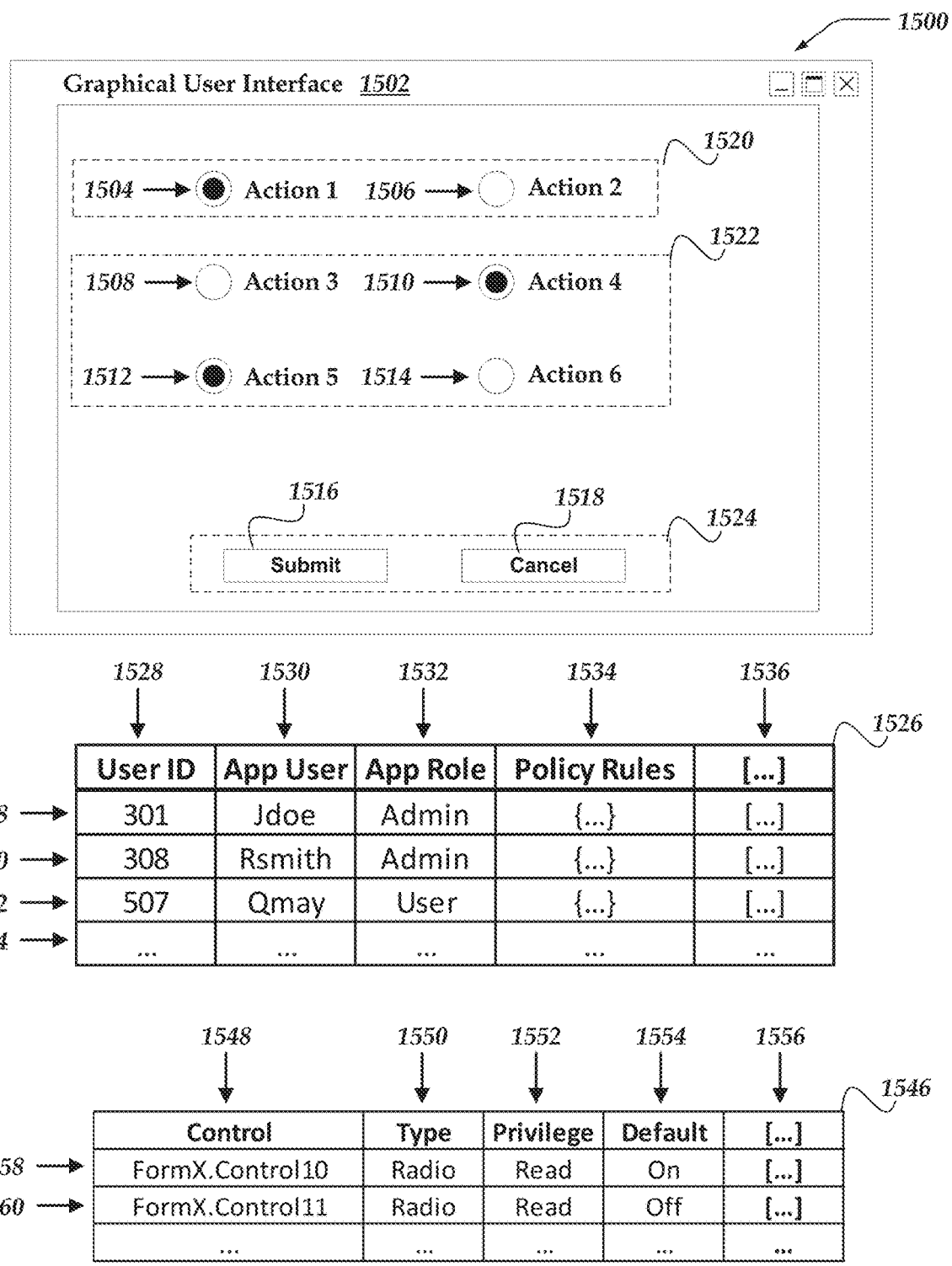
FIG. 15 illustrates a logical schematic for a user interface for virtualized permission and security enforcement in accordance with one or more of the various embodiments.

FIG. 15 illustrates a logical schematic for user interface 1500 for virtualized permission and security enforcement in accordance with one or more of the various embodiments. In some embodiments, virtual policy interfaces may be arranged to extend application provided security systems such that the virtual security layer may enforce security policies that conform to the security model of organizations using applications rather than enforcement of security policies being limited by the security models of those applications.

In this example, for some embodiments, dialog box 1502 may be considered to represent a user interface of an application that enables authorized users to perform some actions. In this example, dialog box 1502 is represented as including various user interface controls, including, control 1504, control 1506, control 1508, control 1510, control 1512, control 1514, button 1516, button 1518, or the like.

In this example, it may be assumed that the native security layer of the hosting application (not shown) enables users assigned the role Administrator (Admin) to access and interact with dialog box 1502. Accordingly, in this example, for some embodiments, a user granted Admin privileges for the application may be authorized (by the native security layer) to access each control in dialog box 1502.

In some embodiments, virtual policy interfaces may be configured to enable particular controls to be associated with additional or different privilege requirements than offered/enforced by the native security layer of the application. In this example, for some embodiments, virtual policy interfaces may be configured to associate one or more controls with different privilege requirements. Accordingly, in this example, control group 1520 indicates that control 1504 and control 1506 may be associated with one or more security policies enforced/provided by a virtual policy interface. Likewise, in this example, for some embodiments, control group 1522 indicates that control 1508, control 1510, control 1512, and control 1514 may be associated with one or more other security policies enforced/provided by a virtual policy interface. Thus, in some embodiments, if a user authorized by the application to interact with dialog box 1502, the virtual policy interface may limit which controls that user may access. In some cases, for some embodiments, organizations may enable two or more users to access the dialog box via the application native security policies while at the same time restricting (or enabling) the privileges of those users to interact with particular features that the native security layer would have allowed.

In some embodiments, infrastructure security engines may be arranged to associate virtual policies with application users. For example, table 1526 may represent a logical schematic of data structures that may be used for associating application users with virtual security policies. Accordingly, in this example, for some embodiments table 1526 may include one or more columns, such as: column 1528 for storing user identifiers; column 1530 for storing application user names; column 1532 for storing application role information; column 1534 for storing virtual policy rules; column 1536 for storing additional fields that may be used for particular implementations; or the like.

Accordingly, in this example, for some embodiments, record 1538 may represent a user that is assigned a role of administrator for the application using the native security layer. Similarly, in this example, for some embodiments record 1540 may represent information for a user that has been assigned a role of administrator for the application using the application's native security layer. Also, in this example, for some embodiments, record 1542 may represent information for a user that has been assigned a role of user (absent application administrative privileges) for the application using the application's native security layer. And, in this example, record 1544 may represent additional records not shown here.

In some embodiments, infrastructure security engines may be arranged to enable organizations to associate user 301 (e.g., record 1538) with different virtual security policies than user 308 (e.g., record 1540) whereas the native security layer may be unable to associated different policies to the two different administrators. Or, similarly, in some embodiments, if the native security layer of an application enables organizations to assign different native security policies to users having the same application role, infrastructure security engines may be arranged to enable organizations to provide more policy granularity by enabling organizations to assign one or more virtual security policies as well.

Note, one of ordinary skill in the art will appreciate that different applications may employ different schemes or representations for user identities, user names, application roles, or the like. Accordingly, in some embodiments, infrastructure security engines may be arranged to enable data structures, such as table 1526 to be modified or adapted using configuration information to account for local requirements or local circumstances. For example, in some embodiments, some applications may employ system verifiable identities based on LDAP repositories or other centralized credential repositories. Further, one of ordinary skill in the art will appreciate that for brevity and clarity data structures (e.g., table 1526) for associating application users with virtual security policies are represented here as a table or table-like data structure. Accordingly, in some embodiments, infrastructure security engines may be configured to implement such data structures using, arrays, dictionaries, key-value databases, relational databases, hash tables, or the like, or combination without departing from the scope of the innovation disclosed herein.

In some embodiments, infrastructure security engines may be arranged to employ one or more data structures, such as table 1546 for declaring privileges virtualized permission and security enforcement. In this example, for some embodiments, table 1546 may include one or more columns, such as: column 1548 for storing form controls name; column 1550 for storing control type information; column 1552 for storing privilege information associated with controls; column 1554 for storing optional default values for controls; column 1556 representing additional columns that may be included; or the like.

In this example, for some embodiments, table 1546 may be employed for associating user privileges with particular application features, such as (in this example) user interface controls. Accordingly, in some embodiments, policy rules included in column 1534 may be represented using other data structures, such as table 1546.

In this example, for some embodiments, record 1558 or record 1560 may be considered to correspond to a user's privilege information for control 1504 and control 1506. In this example, record 1558 and record 1560 indicate that a user associated with table 1546 may be limited to reading the user interface controls identified by FormX.Control10 and FormX.Control11.

Further, in some embodiments, one or more data structures that may be similar to table 1546 may be arranged to associate virtualized privileges with other application features, such as API call, events, or the like. Also, in some embodiments, virtualized privileges may be associated with one or more user interface elements, such as windows, tabs, dialog boxes, or the like. Further, in some embodiments, infrastructure security engine may be arranged to enable virtual privileges to be associated with groups of user interface controls or user interface elements. For example, in some embodiments, two or more user interface windows may be associated with the same virtualized privileges as a group.

Figure 16:
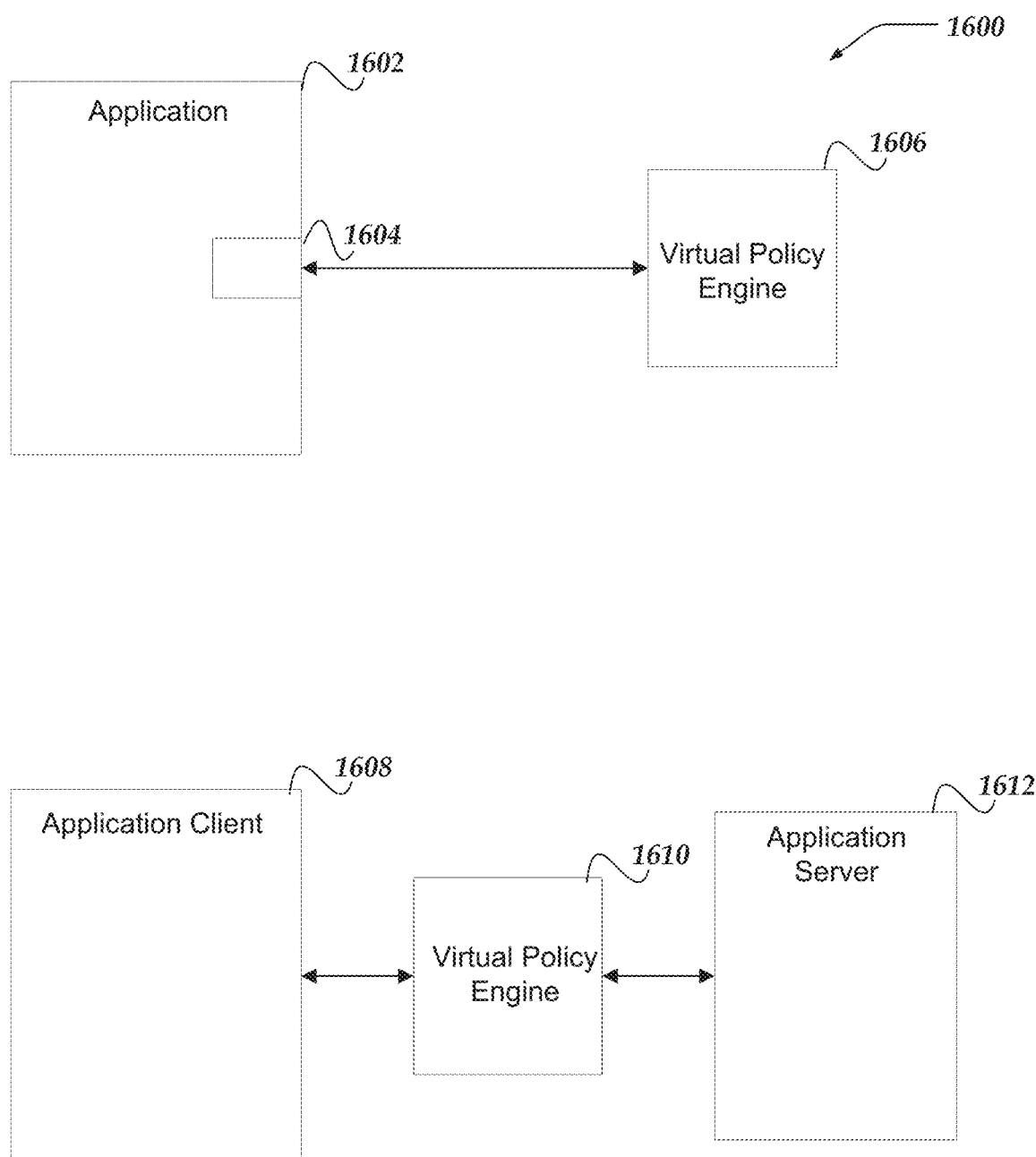
FIG. 16 illustrates a logical schematic for a system for virtualized permission and security enforcement in accordance with one or more of the various embodiments.

FIG. 16 illustrates a logical schematic for system 1600 for virtualized permission and security enforcement in accordance with one or more of the various embodiments. As described above, in some embodiments, virtual security layers may be deployed in various configurations depending on local requirements or local circumstances. In some embodiments, a virtual policy interface may be directly accessed by the application through a local interface. In some embodiments, the local interface may be statically linked into applications by the application developers. Also, in some embodiments, the local interface may be dynamically linked to the application. In some cases, for some embodiments, applications may be designed to provide hooks or other interfaces that may be exploited to integrate application operations with virtual security layers. For example, in some cases, an application may be designed to automatically call one or more pre-action or post-action functions that communicate context information associated with the application activity to external dynamic libraries that may provide access to the virtual policy interface.

Accordingly, in some embodiments, an application, such as application 1602 may be configured to execute one or more pre-action or post-action calls through one or more interfaces, such as interface 1604. In some embodiments, interface 1604 may represent a hook or interface that supports dynamic linking. Also, in some embodiments, interface 1604 may represent an interface to a virtual security layer that may be statically linked such that the application developers program the application to employ the interface to access the virtual policy interface.

In some embodiments, messages or function calls passed to interface 1604 may be provided to a virtual policy engine, such as virtual policy engine 1606. Accordingly, in some embodiments, virtual policy engines may be arranged to enforce the one or more policies (if any) that may be associated with the application activity.

Further, in some embodiments, some applications may be configured to use application clients, such as application client 1608 that communicate to one or more application servers, such as application server 1612. Accordingly, in some embodiments, virtual policy engines, such as virtual policy engine 1610 may be arranged to inspect the communications exchanged between application clients or application servers. Thus, in some embodiments, the virtual policy engines may be arranged to enforce one or more virtual policies based on an evaluation of the communications. In some embodiments, virtual policy engines may be configured to obtain access to some or all of the application client-server communications via ingress agents, egress agents, or mesh agents as described above.

Also, in some embodiments, virtual policy engines may be configured as an endpoint proxy that the application client connects with directly. Accordingly, in some embodiments, the virtual policy engine may forward the communication to the application server if the activity associated with the communication conforms to the one or more policies enforced by the virtual policy engine.

Also, in some embodiments, virtual policy engines may be configured to passively monitor communications between application clients or application servers rather than acting as an endpoint in network.

Also, in some embodiments, virtual policy engines may be configured such that the communication traffic between application clients or application servers may be provided to the virtual policy engines from other monitoring services or mesh agents.

In some embodiments, virtual policy engines may be arranged to obtain updated virtual policies from infrastructure security computers, or the like, similar to how infrastructure security computers may continuously update mesh agents. Also, in some embodiments, virtual policy engines may be arranged to enable local policy updates absent being connected to a remote infrastructure security engine. For example, in some embodiments, policies may be updated on local virtual policy engines using USB drives or other portable media. Thus, in case where the application may be disconnected from a protected/managed network, the virtual policy engines may be configured to enforce virtual policies.

Generalized Operations for Virtualized Permission and Security Enforcement

FIGS. 17-23 represent generalized operations for virtualized permission and security enforcement in accordance with one or more of the various embodiments. In one or more of the various embodiments, processes 1700, 1800, 1900, 2000, 2100, 2200, and 2300 described in conjunction with FIGS. 17-23 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 10-13 or FIGS. 17-23 may be used for virtualized permission and security enforcement in accordance with at least one of the various embodiments or architectures such as those described in conjunction with FIGS. 4-9 or FIGS. 14-16 Further, in one or more of the various embodiments, some or all of the actions performed by processes 1700, 1800, 1900, 2000, 2100, 2200, or 2300 may be executed in part by infrastructure security engine 322, virtual policy engine 326, one or more mesh agents, such as, mesh agent 324, or the like, running on one or more processors of one or more network computers.

Figure 17:
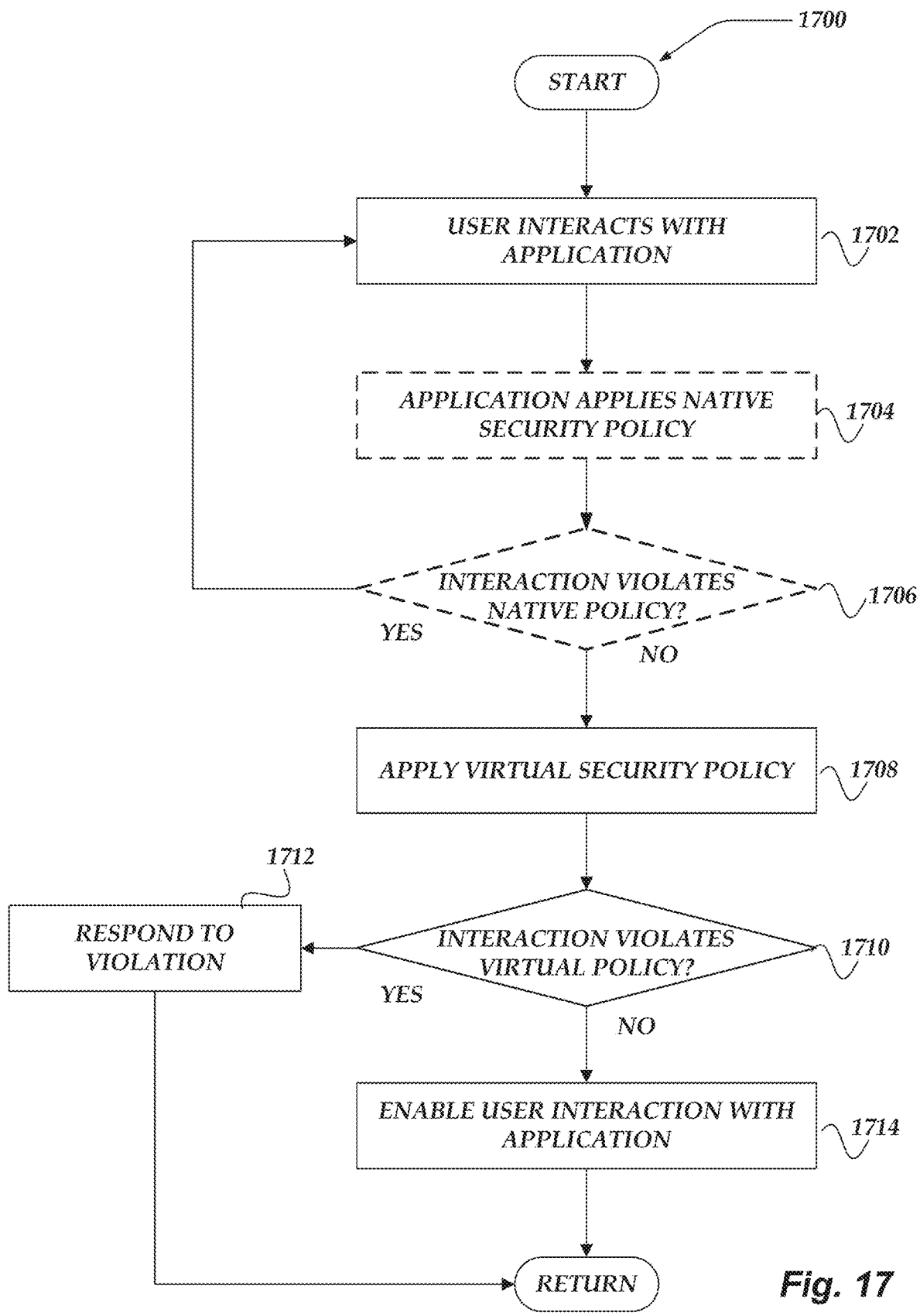
FIG. 17 illustrates an overview flowchart of a process for virtualized permission and security enforcement in accordance with one or more of the various embodiments.

FIG. 17 illustrates an overview flowchart of process 1700 for virtualized permission and security enforcement in accordance with one or more of the various embodiments. After a start block, at block 1702, in one or more of the various embodiments, a user may interact with an application. In some cases, users may be enabled to interact with various applications hosted on various computers. Note, in some cases, users in these contexts may include one or more automated services, remote services, event sources, message feeds, or the like, rather than being limited to live persons.

In some embodiments, interactions with applications may include interacting with one or more controls in graphical user interfaces, interacting with command line user interfaces, or the like. In some cases, for some embodiments, interactions may originate from one or more remote application clients or local application clients. In some cases, for some embodiments, interactions may be directed to native user interfaces provided by the applications. Also, in some embodiments, interactions may include interaction with controls, forms, or the like, presented on web pages, web applications, or the like. Further, in some cases, interactions may include interactions with user interfaces on applications hosted on desktop computers, mobile computers, smart telephones, tablets, or the like.

At block 1704, in one or more of the various embodiments, optionally, the applications may apply or enforce one or more native security policies that may be associated with the applications. In some embodiments, some applications may enable application administrators to establish one or more native security policies. In some embodiments, native security policies may be considered policies that an application supports out-of-box or otherwise separate from virtual security policies enforced by virtual policy engines.

In some embodiments, native security policies may be separate or independent from virtual security policies supported by infrastructure security computers, infrastructure security engines, virtual policy engines, or the like.

Note, this block is indicated as being optional because in some case applications may not have relevant native security polices.

At decision block 1706, in one or more of the various embodiments, optionally, if the user interactions violate the native security policies, control may loop back to block 1702; otherwise, control may flow to block 1708. In some embodiments, applications may be arranged to manage violations of native security policies. The particular management actions may be determined by the particular application and how its native security features may be configured. Thus, in some embodiments, the particular actions taken by applications to enforce native security policies may vary depending on the application.

Note, this block is indicated as being optional because in some cases applications may not have enforceable native security policies.

At block 1708, in one or more of the various embodiments, virtual policy engines may be arranged to apply one or more virtual security policies that may be relevant to the user interactions. As described above, in some embodiments, virtual policy engines may be arranged to enable organizations to configure or define one or more virtual security policies. In some embodiments, organizations may employ the virtual security policies to enforce security models or security policies that may otherwise be unsupported by native security policies of the applications.

Accordingly, in some embodiments, virtual policy engine may be arranged to provide one or more virtual policy interfaces that may enforce one or more virtual security policies that may provide different or additional security protections related to one or more applications.

In some embodiments, virtual policy engines may be arranged to monitor network communication, inter-process communication, or the like, to apply virtual security policies. Also, in some embodiments, virtual policy engines may be arranged to monitor application activity using operating system or window manager facilities. Also, in some embodiments, applications may be configured to pass application information or activity information directly to virtual policy interfaces via APIs, interfaces, or the like, that enable virtual policy engine to enforce virtual security policies.

At decision block 1710, in one or more of the various embodiments, if the user interactions violate one or more virtual security policies, control may flow to block 1712; otherwise, control may flow to block 1714. In some embodiments, virtual policy engines may be arranged to compare the user identity or user activity information with one or more active virtual security policies to determine if the application interactions or application activity conforms to the one or more active virtual security policies.

At block 1712, in one or more of the various embodiments, infrastructure security engines or virtual policy engines may be arranged to respond to virtual security policy violations. In some embodiments, if the activity violated one or more virtual security policies, virtual policy engines may be arranged to execute one or more response actions. In some embodiments, virtual policy engines may be configured to execute particular response actions that conform to the local requirements or local circumstances for the organization using or hosting the application. For example, in some embodiments, virtual policy engines may be configured to perform one or more actions that deny or prevent the activity from proceeding. Also, in some embodiments, virtual policy engines may be configured to modify the activity to conform with one or more virtual security policies. For example, if the activity may be exfiltrating data that includes protected/sensitive personally identifiable information (PII), virtual policy engines may be configured to automatically mask or remove the PII rather than completely disable the activity.

At block 1714, in one or more of the various embodiments, virtual policy engines may be arranged to enable the user interactions with applications. In some embodiments, virtual policy engines may be arranged to let the conforming activity pass-through without inference. In some embodiments, if the activity includes messages or network communication, the virtual policy engine may be arranged to let the associated communication data pass through unmodified or otherwise unimpeded. In some embodiments, if the virtual policy interface is enabled by the application calling one or more virtual policy engine API functions, one or more return values may indicate to the application that the evaluated activity conforms to the relevant virtual security policies. Accordingly, in some embodiments, the application may proceed with handling/executing the activity.

Next, in one or more of the various embodiments, control may be returned to a calling process.

Figure 18:
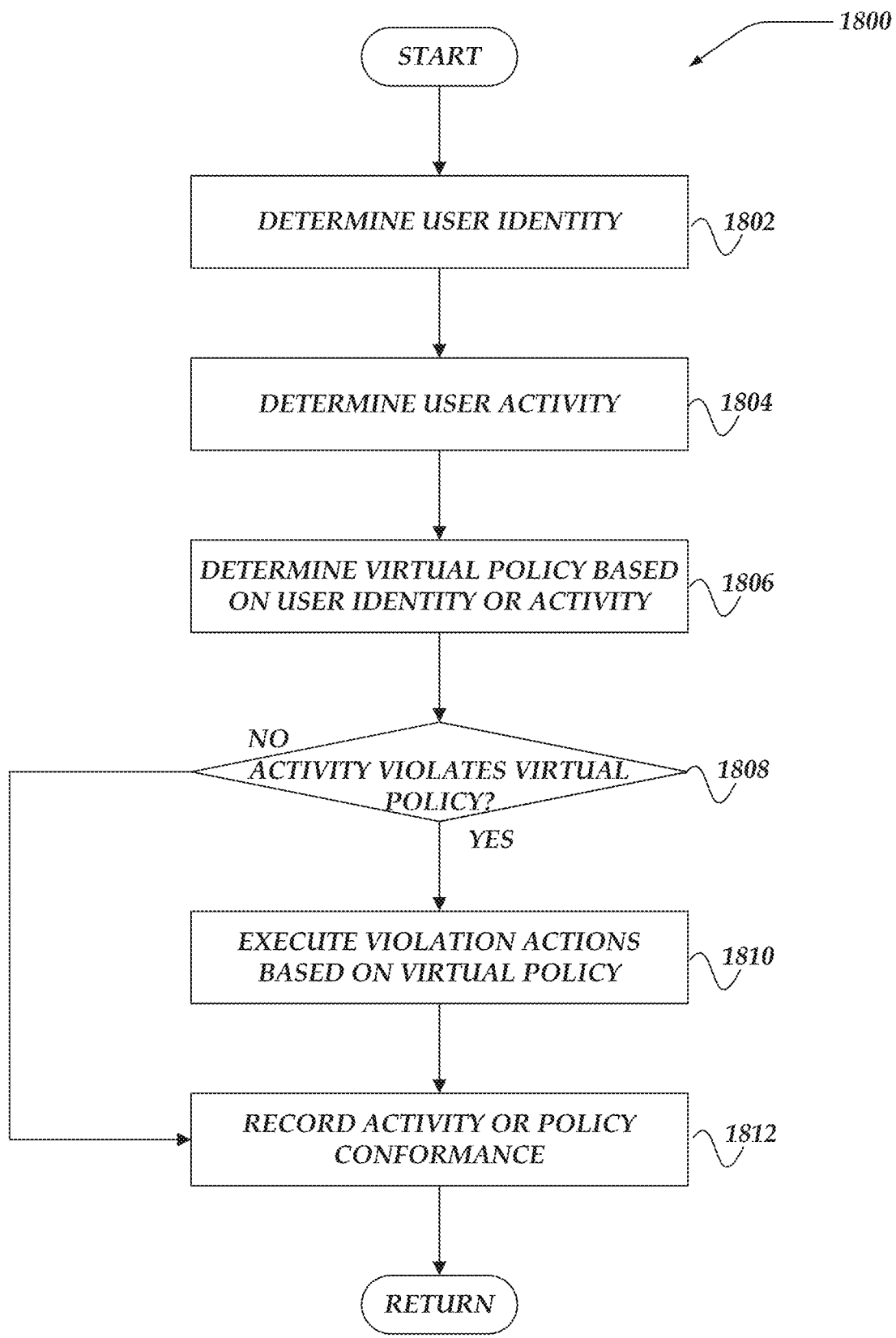
FIG. 18 illustrates a flowchart of a process for virtualized permission and security enforcement in accordance with one or more of the various embodiments.

FIG. 18 illustrates a flowchart of process 1800 for virtualized permission and security enforcement in accordance with one or more of the various embodiments. After a start block, at block 1802, in one or more of the various embodiments, virtual policy engines may be arranged to determine the user identity. In some embodiments, an important aspect of determining which virtual security policies may be relevant may depend on determining the identity of the user.

Accordingly, in some embodiments, virtual policy engine may be arranged to determine user identity based on the activity information. In some embodiments, if the activity may be associated with communicated data, virtual policy engines may examine the communication data to determine user identity from one or more fields included in the communication data.

Also, in some embodiments, virtual policy engines (or infrastructure security engines) may be arranged to monitor the state of application sessions. Accordingly, in some embodiments, virtual policy engines may track one or more user credentials that may be determined at the initiation of the application sessions. In some embodiments, virtual policy engines may monitor sign-in handshake exchanges to determine if otherwise opaque tokens or keys may be associated with a particular user. Accordingly, in some embodiments, virtual policy engines may be arranged to maintain/track an association of the opaque tokens with a user identity. Note, in some embodiments, virtual policy engines may be arranged to employ plugins, extensions, dynamic libraries, or the like, that may be specialized for particular applications to interpret one or more application protocols for associating a user's system or network credentials with application credentials if necessary.

Further, in some embodiments, some applications may be arranged to have anonymous users such that the concept of user identity may not be relevant. For example, some single user applications may not implement user identify features. Accordingly, in some embodiments, as discussed above for enforcing identity and activity based network security policies, virtual policy engines may be configured to employ identity information determined by infrastructure security engines.

Also, in some embodiments, virtual policy engines operating in concert with infrastructure security engines may be arranged to rely on user identity information provided by or determined by the infrastructure security engines.

Further, in some embodiments, virtual policy engines may be arranged to classify users into types or categories rather than determining or tracking unique user identities. For example, in some embodiments, virtual policy engines may be configured to track or monitor users based on user roles rather than individual user identities.

At block 1804, in one or more of the various embodiments, virtual policy engines may be arranged to determine the user activity. In some embodiments, virtual policy engines may be arranged to employ communication data, or other context information to determine the activity. In some embodiments, if the application activity may be messaging/communication based, virtual policy engines may be arranged to evaluate the communication data to determine the activity.

Also, in some embodiments, virtual policy engines may be arranged to evaluate other metrics or values for determining activities. For example, in some embodiments, virtual policy engines may be arranged to employ local virtual policy interfaces that may interrogate operating systems, window managers, or the like, to determine information that may be used to determine the relevant activity.

In some embodiments, virtual policy engines may be arranged to classify various different activities into one or more activity categories or activity types. Accordingly, in some embodiments, applications that generate activities with many permutations may be reduced to a more manageable number of activities. For example, in some embodiments, a virtual policy engine may be configured to categorize all activities associated with a particular application events as one activity category even if the individual events may include many distinct characteristics. Likewise, for example, in some embodiments, virtual policy engines may be configured to categorize all activity associated with particular user interface windows as being the in the same category. For example, in some embodiments, if a user is accessing a particular web page in a protected web site, the activity may be categorized as ACCESS, or the like. Likewise, for example, if the user may be selecting a user interface button, the activity may be categorized as BUTTON_CLICK, or the like. Note, in anticipation of adaptation to arbitrary control types or arbitrary actions, virtual policy engines may be arranged to employ configuration information to determine which particular activity categories or activities may be occurring. Also, in some embodiments, virtual policy engines may be arranged to employ rules, regular expressions, heuristics, or the like, provided by configuration information for categorizing actions into particular activities or activity types to account for local circumstances, local requirements, or changes to user interfaces.

At block 1806, in one or more of the various embodiments, virtual policy engines may be arranged to determine one or more virtual policies based on the user identity or user activity. In some embodiments, virtual policy engines (or infrastructure security engines) may be arranged to employ one or more data stores that enable one or more virtual security policies to be associated with one or more activities. In some embodiments, these data stores may include tables, indexes, data structures, or the like, that enable activities, resources, users, or the like, to be associated with virtual security policies.

Accordingly, in some embodiments, virtual policy engines may be arranged to query the virtual security policy data stores to determine if one or more virtual security policies may match the application activity. In some embodiments, data stores may be configured to support queries using conventional query languages, such as SQL or SQL-like queries. Also, in some embodiments, data stores may be configured as key-value data stores, b-trees, dictionaries, hash tables, custom data structures, or the like, that may enable the determination of virtual security policies that may be associated with an activity.

In some embodiments, an initial query may provide a result that includes more than one virtual security policy. Accordingly, in some embodiments, virtual policy engines may be arranged to perform one or more additional actions to evaluate which (if any) of the virtual security policies in the result may be application to the activity and user. Also, in some embodiments, administrators may be enabled to associate more than one virtual security policies with particular activities.

At decision block 1808, in one or more of the various embodiments, if the activity violates one or more virtual policies, control may flow to block 1810; otherwise, control may flow to block 1812.

In some embodiments, virtual security policies may be expressed in various imperative or declarative representations. In some cases, for some embodiments, one or more standards-based representations or computer readable languages may be employed. For example, in some cases, an organization may use a conventional or standardized computer readable language for representing policies while another organization may prefer to express virtual security policies using another language for representing policies that may be tailored to their particular circumstances. Accordingly, in some embodiments, virtual policy engines may be arranged to employ rules, libraries, scripts, parsers, grammars, large language models, or the like, provided via configuration information for interpreting virtual security policies. In some embodiments, virtual policy engines may be arranged to dynamically select parsers, interpreters, large language models, or the like, for evaluating virtual security policies based on the user, activity, organizations, or the like.

At block 1810, in one or more of the various embodiments, virtual policy engines may be arranged to execute one or more violation actions based on the virtual policy that may be violated. In some embodiments, virtual policy engines may be arranged to enable organizations to configure one or more violation actions that may be executed in response to policy violations. In some embodiments, virtual policy engines may be arranged to execute one or more corrective actions. In some embodiments, corrective actions may include modifying data, suppressing actions, generating alerts, generating log records, or the like. In some embodiments, virtual policy engines may be configured to forward events, alerts or triggers to other services that may be used to aggregate events/alerts from more than one or source or sensor services.

At block 1812, in one or more of the various embodiments, the virtual policy engines may be arranged to record activity or policy conformance. In some embodiments, virtual policy engine may be arranged to collect one or more metrics or records associated with violations of the virtual security policies. As mentioned above, in some embodiments, virtual policy engines may be configured to forward information to other services. Also, in some embodiments, virtual policy engines may be arranged to provide one or more user interfaces that enable administrators to review or analyze virtual security policy violations.

Next, in one or more of the various embodiments, control may be returned to a calling process.

Figure 19:
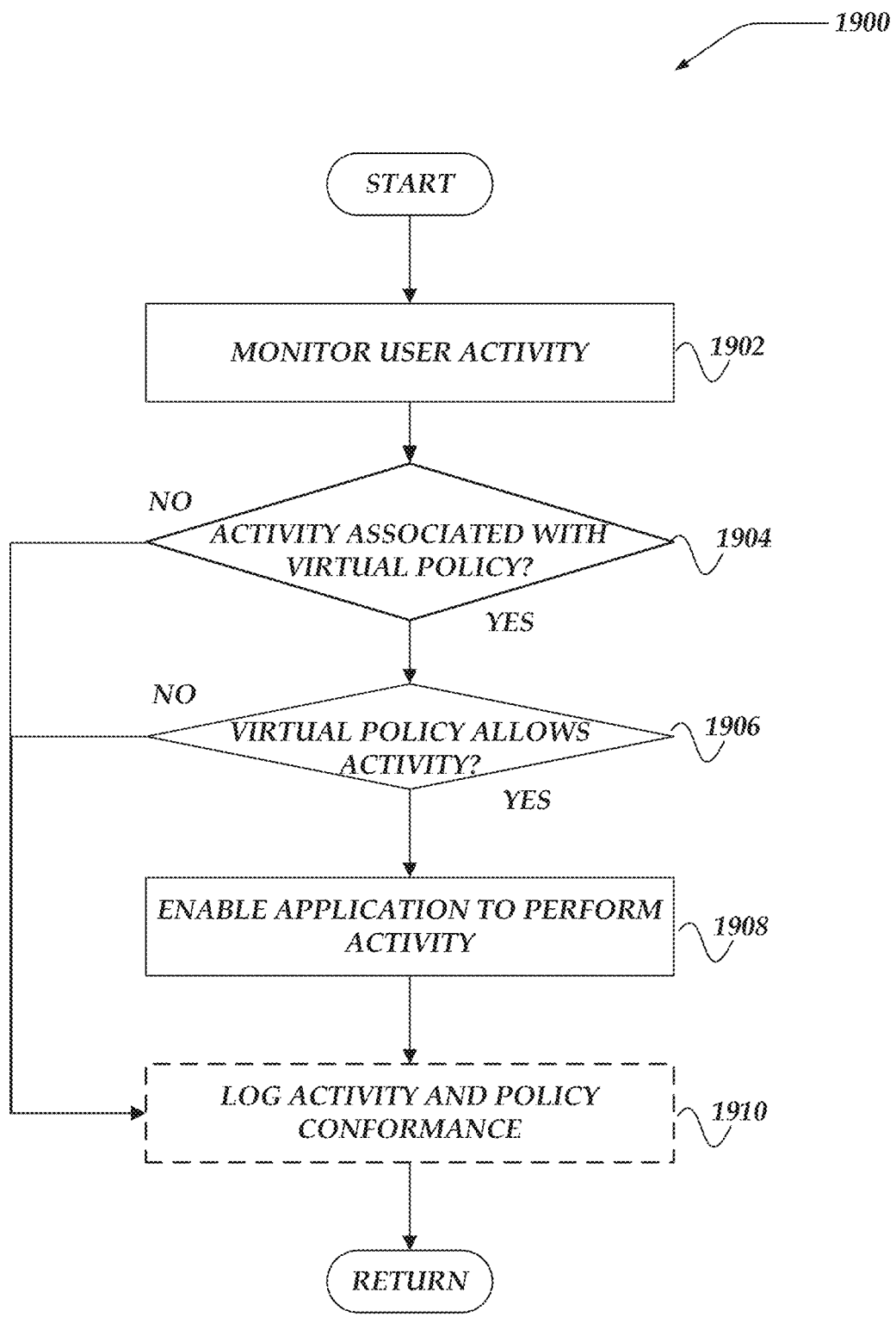
FIG. 19 illustrates a flowchart of a process for virtualized permission and security enforcement in accordance with one or more of the various embodiments.

FIG. 19 illustrates a flowchart of process 1900 for virtualized permission and security enforcement in accordance with one or more of the various embodiments. After a start block, at block 1802, in one or more of the various embodiments, virtual policy engines may be arranged to monitor the user activity. In some embodiments, virtual policy engines may be arranged to monitor application activity using various mechanisms. In some embodiments, the particular monitoring mechanisms may depend on the architecture or operational features of the applications of interest. For example, if the application may be a client-server application, virtual policy engines may be arranged to monitor communications made between the client application and server application. In some cases, these monitored communications may be network communications in a monitored/protected network or mesh network. Also, in some embodiments, virtual policy engines may be arranged to monitor activity by observing which windows an application may be presenting. For example, various window managers or operating systems may enable privileged applications, such as virtual policy engines to monitor or otherwise observe window identities, window classes/types, or the like. Accordingly, in such cases, for some embodiments, virtual policy engines may be configured to associate one or more virtual policies with particular windows that may be generated by a monitored application.

Also, in some embodiments, virtual policy engines may be configured to employ operating system facilities that enable privileged process to monitor which system calls may be executed by applications.

Further, in some embodiments, some runtime environments or virtual machines may enable privileged applications, such as virtual policy engines access to APIs or interfaces that enable application features, windows, objects, or the like, to be examined in real-time while the applications are running.

Further, in some embodiments, virtual policy engines may be arranged to provide one or more APIs or interfaces that enable applications to be programmed to explicitly pass activity information to virtual policy engines. Accordingly, in some embodiments, monitored applications may be providing activity information to virtual policy engines via one or more APIs or interfaces provided by the virtual policy engines. In some cases, for some embodiments, applications may be enabled to statically or dynamically link with one or more libraries that provide APIs or interfaces that enable virtual policy engines to monitor application activity.

In some embodiments, virtual policy engines may be arranged to employ libraries, scripts, parsers, grammars, filters, or the like provided via configuration information.

Accordingly, in some embodiments, virtual policy engines may be adapted to monitor applications using various methods. In some cases, this may enable virtual policy engines to be adapted to monitor custom applications that may be deployed by organizations.

At decision block 1904, in one or more of the various embodiments, if the activity may be associated with a virtual security policy, control may flow to decision block 1906; otherwise, control may flow to block 1910.

In some embodiments, virtual policy engines may be arranged to associate one or more virtual security policies with various activities. In some embodiments, the association of virtual security policies may depend on the type of activity information that may be expected to be available. Accordingly, in some embodiments, virtual policy engines may be arranged to enable administrators to associate one or more virtual security policies with activities based on one or more user identity information or application activity.

In some embodiments, virtual policy engines may be provided activity information that explicitly includes or declares user identities or activity identity.

Also, in some embodiments, virtual policy engines may be arranged to infer identities or activities based on context information that may be provided with the activity information. Accordingly, in some embodiments, virtual policy engines may be configured to execute one or more actions to determine the user identity, client/host identity, activity identity, or the like based on the information provided to the virtual policy engine. In some embodiments, application monitoring by virtual policy engines may determine or observe local usernames, local email addresses, aliases, or the like, that may be employed to lookup a central or global identity for a user. For example, in some embodiments, virtual policy engines may be arranged to submit user aliases to a centralized LDAP server (or the like) to determine authoritative user information, including their system identity.

At decision block 1906, in one or more of the various embodiments, if the virtual security policy allows the activity, control may flow to block 1908; otherwise, control may flow to block 1910. In some embodiments, security policies may be defined or implemented using imperative or declarative computer readable languages. Accordingly, in some embodiments, policies may include instructions that compare one or more portions of the activity information with particular conditions declared as part of the virtual security policy.

At block 1908, in one or more of the various embodiments, virtual policy engines may be arranged to enable the application to perform the activity. In some embodiments, actions for enabling application activity may vary depending on the application and how the virtual policy engines may be integrated with the application. For example, in some embodiments, if the virtual policy engines may be configured to monitor the network communications between client applications and server applications, enabling the activity may include forwarding the associated network traffic to its next destination in the network. In some embodiments, virtual policy engines may be configured to signal to infrastructure security engines that the activity conforms to the relevant virtual security policies and relying on the infrastructure security computer to forward the communication to its destination.

At block 1910, in one or more of the various embodiments, optionally, virtual policy engines may be arranged to log the activity and policy conformance. Accordingly, in some embodiments, virtual policy engines may enable manual or automated analysis regarding the application of various virtual security policies. For example, in some embodiments, virtual policy engines may be arranged to provide a dashboard user interface that display various metrics associated with policy conformance, such as, rate of conformance/non-conformance, count of conformance/non-conformance, or the like.

Next, in one or more of the various embodiments, control may be returned to a calling process.

Figure 20:
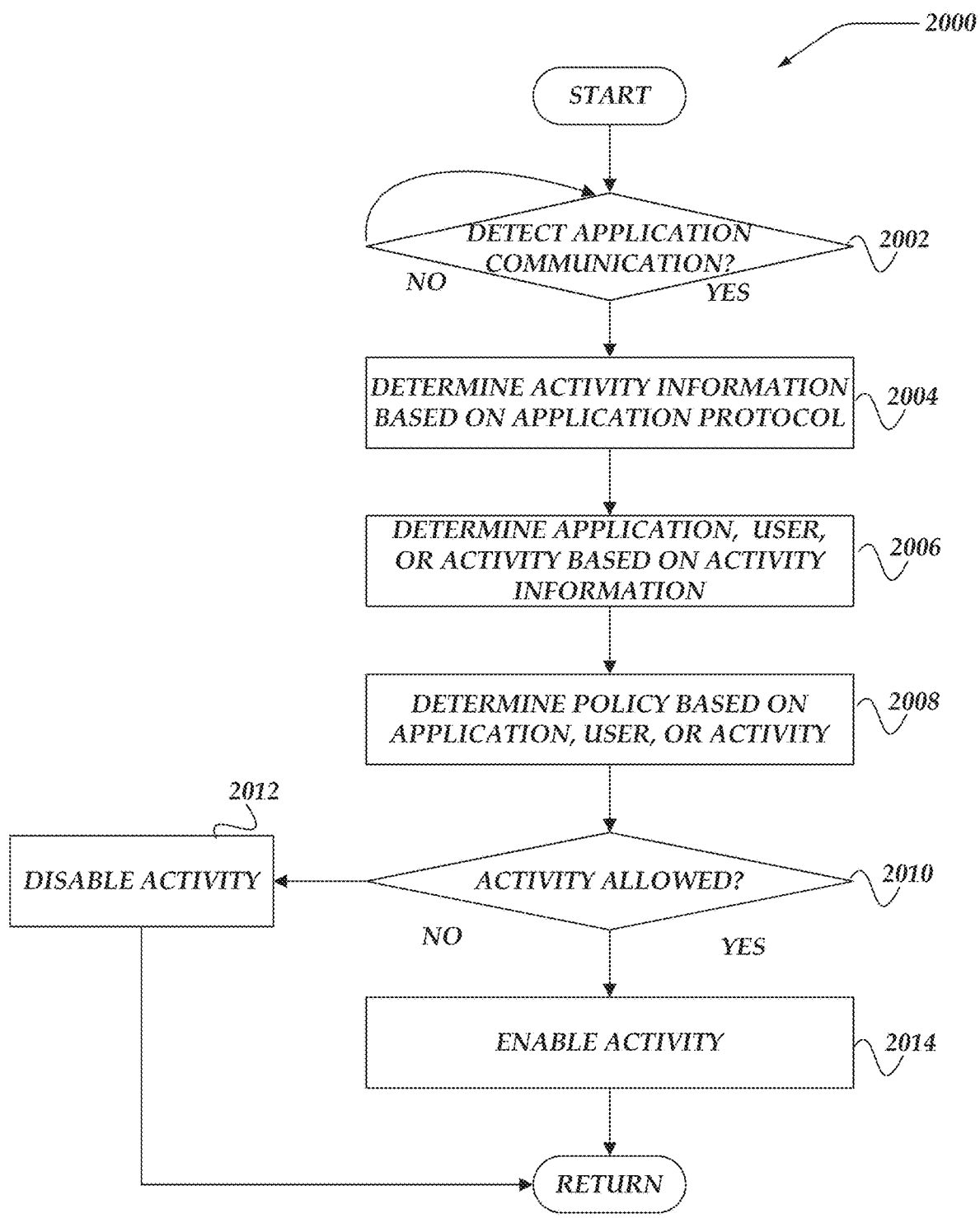
FIG. 20 illustrates a flowchart of a process for virtualized permission and security enforcement in accordance with one or more of the various embodiments.

FIG. 20 illustrates a flowchart of process 2000 for virtualized permission and security enforcement in accordance with one or more of the various embodiments. After a start block, at decision block 2002, in one or more of the various embodiments, if a virtual policy engine detects one or more application communications, control may flow to block 2004; otherwise, control may loop back to decision block 2002. In some embodiments, virtual policy engines may be enabled to monitor network traffic or other communications between applications. In some cases, this communication may be associated with client applications and server applications. Also, in some cases, for some embodiments, monitored communications may be between peer applications, federated applications, or disparate applications. Further, as described above, in some embodiments, virtual policy engines may be arranged to monitor interprocess communication that may occur between applications on the same host or among different portions (different processes) that may be considered the same application.

At block 2004, in one or more of the various embodiments, virtual policy engines may be arranged to determine activity information based on an application protocol.

In one or more of the various embodiments, virtual policy engines may be arranged to determine an application protocol associated with the one or more communications. In some embodiments, virtual policy engines may be arranged to support various application protocols. Accordingly, in some embodiments, virtual policy engines may be arranged to employ one or more filters, pattern matching, or the like, to determine the particular application protocol being employed to carry the detected application communications.

In some embodiments, virtual policy engines may be configured to support a variety of different application protocols. In some embodiments, virtual policy engines may be arranged to be adapted to additional applications as required. Accordingly, in some embodiments, virtual policy engines may be arranged to employ rules, grammars, parsers, instructions, or the like provided via configuration information to enable adaptation to additional application protocols. For example, in some embodiments, if an organization may be employing a custom application, customized parser libraries may be provided via configuration information to enable virtual policy engines to interpret the custom application protocol.

At block 2006, in one or more of the various embodiments, virtual policy engines may be arranged to determine the application, user, or activity based on activity information.

In one or more of the various embodiments, virtual policy engines may be arranged to determine one or more activities based on the communication payload. In some embodiments, virtual policy engines may be arranged to interpret the content of communication traffic in view of the determined application protocol. Accordingly, in some embodiments, virtual policy engines may be arranged to determine one or more activities associated with the detected application communications. For example, in some embodiments, application protocols may declare one or more fields that may include values that may be associated with one or more activities. Accordingly, in some embodiments, virtual policy engines may be configured to compare one or more field values determined in the communication traffic to determine the activity.

In some embodiments, virtual policy engines may be arranged to define one or more activities based on one or more application protocol field values. For example, in some embodiments, virtual policy engines may be configured to execute one or more rules to compare one or more field values with one or more field values declared to be associated with particular activities. In some embodiments, the activity may be defined to correspond to codes, flags, or the like, that may be defined as part of the application protocol. Also, in some embodiments, activities may be somewhat independent from the application protocol. For example, for some embodiments, if an application protocol defines ten different states or actions, a virtual policy engine may be configured to map the ten different states or actions to three activities. Likewise, in some embodiments, virtual policy engines may be configured to determine activities based on a combination of the values for more than one field value. Accordingly, in some embodiments, virtual policy engines may be arranged to enable administrators declare or define one or more arbitrary activities based on evaluating one or more application protocol fields.

At block 2008, in one or more of the various embodiments, virtual policy engines may be arranged to determine one or more virtual security policies based on the application, user, or activity.

In some embodiments, virtual policy engines may be arranged to enable administrators to associate virtual security policies with one or more of applications, users, or activities.

In some embodiments, virtual policy engines may be arranged to enable administrators to map applications, users, activity, or the like, or combination thereof to one or more virtual security policies.

At decision block 2010, in one or more of the various embodiments, if the activity may be allowed, control may flow to block 2014; otherwise, control may flow to block 2012.

At block 2012, in one or more of the various embodiments, virtual policy engines may be arranged to disable the activity. As described above, the particular response to activities that do not conform to their associated virtual security policies may be defined as part of the particular virtual security policy or adjacent to the virtual security policy. For example, in some embodiments, virtual policy engines may be configured to modify, drop or block communication traffic that may be associated with activities that do not conform to the relevant virtual security policies. Next, in one or more of the various embodiments, control may be returned to a calling process.

At block 2014, in some embodiments, virtual policy engines may be arranged to enable the activity. As described above, the particular response to activities that conform to their associated virtual security policies may be defined as part of the particular virtual security policy or adjacent to the virtual security policy. For example, in some embodiments, virtual policy engines may be configured to pass-through communication traffic that may be associated with activities that conform with the relevant virtual security policies.

Next, in one or more of the various embodiments, control may be returned to a calling process.

Figure 21:
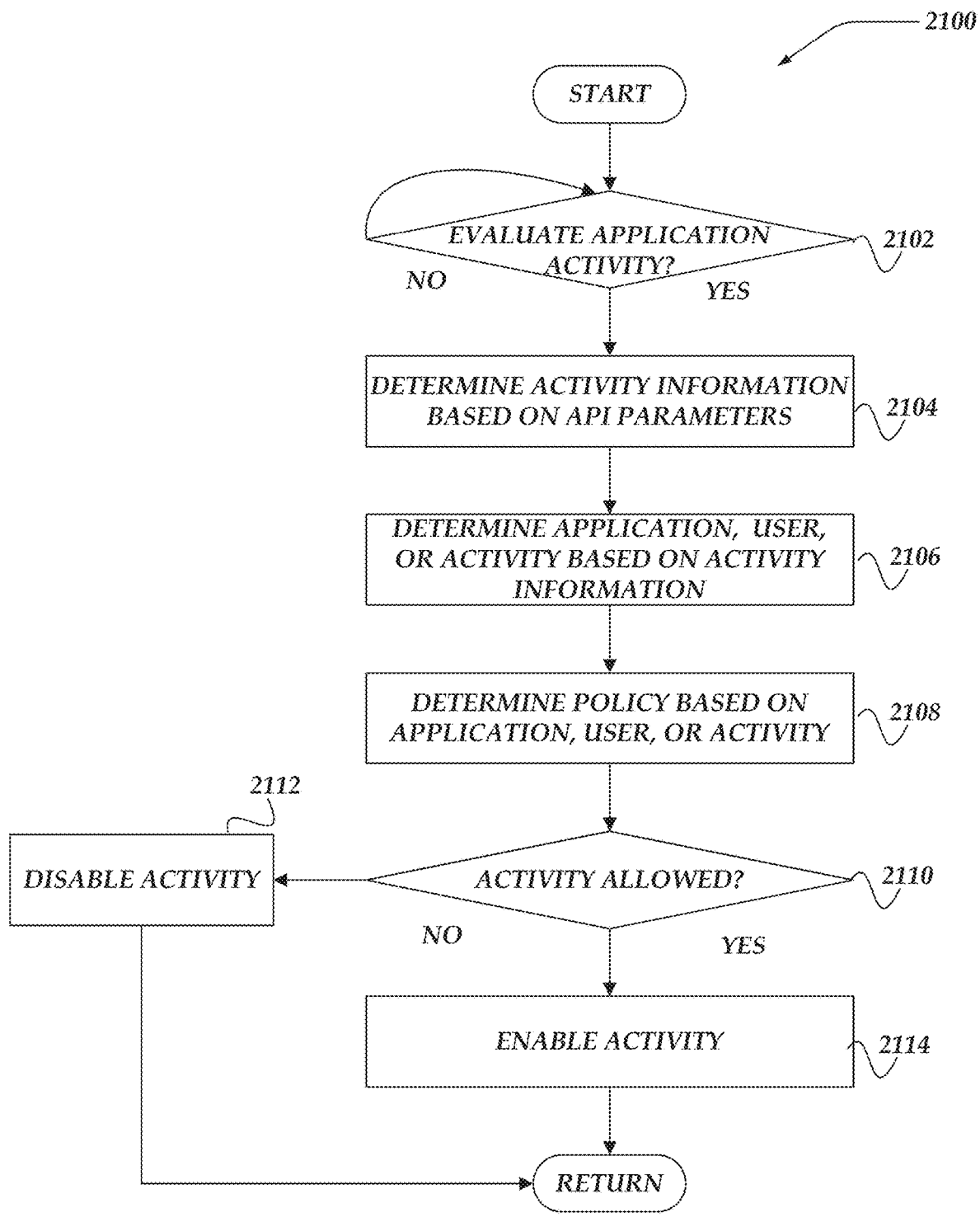
FIG. 21 illustrates a flowchart of a process for virtualized permission and security enforcement in accordance with one or more of the various embodiments.

FIG. 21 illustrates a flowchart of process 2100 for virtualized permission and security enforcement in accordance with one or more of the various embodiments. After a start block, at decision block 2102, in one or more of the various embodiments, if a virtual policy engine may be enabled to evaluate application activity, control may flow to block 2104; otherwise, control may loop back to decision block 2102. As described above, in some embodiments, virtual policy engines may be arranged to provide APIs or interfaces that may enable application to submit activity information to th virtual policy engines. In some embodiments, the APIs or interfaces may be called directly from within the application. For example, in some embodiments, application developers may design applications to use the provided APIs or interfaces to provide or enforce security policies for the application. Accordingly, in some embodiments, applications may submit activity information via the APIs or interfaces provided by virtual policy engines to determine if the activities conform to relevant virtual security policies.

At block 2104, in one or more of the various embodiments, virtual policy engines may be arranged to determine information associated with the activity. In some embodiments, virtual policy engines may be arranged to enable calling applications to submit one or more parameters associated with the activities of interest. Accordingly, for some embodiments, the information passed to virtual policy engines via APIs or interface may be referred to as activity information.

At block 2106, in one or more of the various embodiments, virtual policy engines may be arranged to determine the one or more of the application, the user, or the activities based on the parameters. As described above, parameters passed to the APIs/interfaces may be considered activity information. Accordingly, in some embodiments, virtual policy engines may be arranged to employ the activity information to determine the application, user, or activity.

In some embodiments, virtual policy engines may be arranged to employ one or more rules, instructions, or the like that may be separate or included in particular virtual security policy definitions to determine activities. For example, in some embodiments, API may include parameters that a calling application may employ to identify the activity of interest. In some embodiments, virtual policy engines may be configured to use more than one API parameter to determine an activity.

At block 2108, in one or more of the various embodiments, virtual policy engines may be arranged to determine one or more virtual security policies based on the application, user, or activity.

In some embodiments, virtual policy engines may be arranged to enable administrators to associate virtual security policies with one or more of applications, users, or activities.

In some embodiments, virtual policy engines may be arranged to enable administrators to map applications, users, activities, or the like, or combination thereof to one or more virtual security policies.

At decision block 2110, in one or more of the various embodiments, if the activity may be allowed by the relevant virtual policies, control may flow to block 2114; otherwise, control may flow to 2112.

At block 2112, in one or more of the various embodiments, virtual policy engines may be arranged to disable the activity. As described above, the particular response to activities that do not conform to their associated virtual security policies may be defined as part of the particular virtual security policy or adjacent to the virtual security policy. For example, in some embodiments, APIs of interfaces provided by virtual policy engines may be configured to provide a response that may indicate that the evaluated activities do not conform to the relevant virtual security policies. Next, in one or more of the various embodiments, control may be returned to a calling process.

At block 2114, in one or more of the various embodiments, virtual policy engines may be arranged to enable the activity.

As described above, the particular response to activities that conform to their associated virtual security policies may be defined as part of the particular virtual security policy or adjacent to the virtual security policy. For example, in some embodiments, APIs or interfaces provided by virtual policy engines may be configured to provide a response that may indicate that evaluated activities do conform to the relevant virtual security policies.

Next, in one or more of the various embodiments, control may be returned to a calling process.

Figure 22:
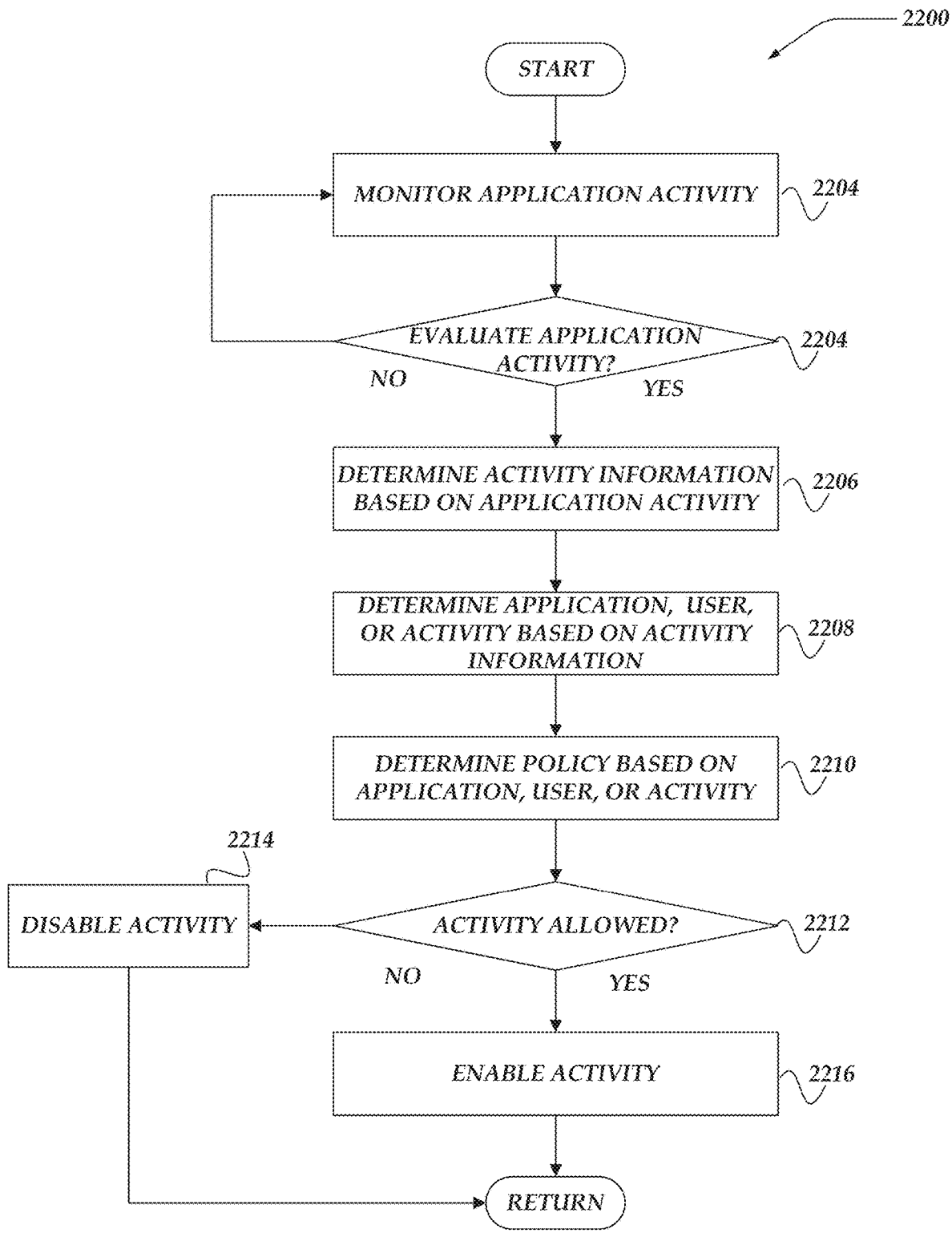
FIG. 22 illustrates a flowchart of a process for virtualized permission and security enforcement in accordance with one or more of the various embodiments.

FIG. 22 illustrates a flowchart of process 2200 for virtualized permission and security enforcement in accordance with one or more of the various embodiments. After a start block, at block 2204, virtual policy engine may be arranged to monitor application activity. In some embodiments, virtual policy engines (or virtual policy interfaces) may be arranged to utilize operating system features or window manager features to monitor the user activity for an application. In some embodiments, virtual policy engines may be arranged to employ various features, such as system call monitoring, window identity tracking, window class tracking, screen capturing, or the like, or combination thereof to observe or monitor application activity. For example, in some embodiments, virtual policy engines may be configured to receive notifications if user interface windows may be opened, moved, hidden, displayed, or the like. In some cases, such notification mechanisms may be built-on features of an operating system or window manager running on the computer that may be hosting the application of interest. In some cases, for some embodiments, virtual policy engines may be arranged to register hooks, event sinks, message queues, or the like with an operating system or window manager to enable such notifications to be provided to the virtual policy engines.

Also, in some embodiments, virtual policy engines may be arranged to employ application monitoring features provided by various runtime environment or virtual machines. Accordingly, in some embodiments, virtual policy engines may be enables to use reflection mechanisms or other features provided by runtime environments to traverse window hierarchies, objects, observe internal messages, or the like of applications hosted in those runtime environments.

In some embodiments, virtual policy engines may be arranged to include one or more kernel modules, privileged libraries, virtual device drivers, or the like that may enable virtual policy engines to employ one or more privileged features of operating systems, window managers, or runtime environments. Accordingly, in some embodiments, virtual policy engines may be arranged to determine various information about running applications, such as, process name, process identity, window identities, window classes, window titles, or the like. In some cases, for some embodiments virtual policy engines may be arranged to traverse user interface window hierarchies, objects, internal messaging, or the like for applications.

Also, in some embodiments, virtual policy engines may be arranged to employ screen capturing to periodically capture or analyze application activity based on what is shown on displays of computers hosting applications of interest. For example, in some embodiments, virtual policy engines may be configured to capture images of the current user interfaces that may be opened on computers. Accordingly, in some embodiments, virtual policy engines may be arranged to employ machine vision, optical character recognition, or the like, or combination thereof to evaluate application activity.

Also, in some embodiments, virtual policy engines may be arranged to employ mouse/pointer tracking, key stroke monitoring (key logging), user eye tracking, or the like to monitor user activity that may be associated with one or more applications of interest.

In some embodiments, virtual policy engines may be configured with information directed to particular applications that may enable particular windows or application states to be determined. For example, in some embodiments, virtual policy engines may be pre-configured with window hierarchy information, application state models, or the like, that may enable virtual policy engines to determine activities of the application. Accordingly, in some embodiments, virtual policy engines may be configured to recognize which windows or application features may be accessible from which windows. For example, in some embodiments, a virtual policy engine monitoring application A may be configured to know that from window X, windows A, B, C may be accessed.

In some embodiments, virtual policy engines may be arranged to be adaptable to arbitrary applications, operating systems, window managers, runtime environments, or the like. Accordingly, in some embodiments, virtual policy engines may be arranged to employ rules, libraries, modules, application state/flow information, or the like, provided via configuration information to adapt to additional applications, updated applications, custom applications, or the like.

At decision block 2204, in one or more of the various embodiments, if a virtual policy engine may be enabled to evaluate application activity, control may flow to block 2206; otherwise, control may loop back to block 2202.

At block 2206, in one or more of the various embodiments, virtual policy engines may be arranged to determine information associated with the activity. In some embodiments, virtual policy engines may be configured to associate particular activities with particular user interface windows, user interface controls, or the like. Accordingly, in some embodiments, virtual policy engines may be arranged to evaluate activities based on various characteristics of the monitored user interfaces. In some embodiments, such characteristics or metrics may include, process names, process identity, window identities, window classes, window titles, mouse/pointer position, mouse/pointer movement, point of gaze, gaze motion, object type, object identity, message type, message identity, or the like.

At block 2108, in one or more of the various embodiments, virtual policy engines may be arranged to determine one or more of the application, the user, or the activities based on the application activity information.

In some embodiments, virtual policy engines may be arranged to employ one or more rules, instructions, or the like that may be separate or included in virtual security policy definitions to determine activities. For example, in some embodiments, virtual policy engines may be configured to associate particular user interface windows, mouse/pointer locations, user interface controls, or the like with particular activities. For example, in some embodiments, Window A may be associated with a protected activity that may be declared in a virtual security policy. Likewise, for example, one or more user interface controls in a particular window may be associated with particular activities that may be associated with one or more virtual security policies. Also, in some embodiments, activities may be associated with objects, object types, messages, message types, or the like of applications.

At block 2210, in one or more of the various embodiments, virtual policy engines may be arranged to determine one or more virtual security policies based on the application, user, or activities.

As described above, in some embodiments, virtual policy engines may be arranged to enable administrators to associate virtual security policies with one or more of applications, users, or activities.

Accordingly, in some embodiments, virtual policy engines may be arranged to enable administrators to map applications, users, activities, or the like, or combination thereof to one or more virtual security policies.

At decision block 2212, in one or more of the various embodiments, if the activity may be allowed by the relevant virtual security policies, control may flow to block 2216; otherwise, control may flow to 2214.

At block 2214, in one or more of the various embodiments, virtual policy engines may be arranged to disable the activity. As described above, the particular response to activities that do not conform to their associated virtual security policies may be defined as part of the particular virtual security policy or adjacent to the virtual security policy.

Next, in one or more of the various embodiments, control may be returned to a calling process.

At block 2216, in one or more of the various embodiments, virtual policy engines may be arranged to enable the activity.

As described above, the particular response to activities that conform to their associated virtual security policies may be defined as part of the particular virtual security policy or adjacent to the virtual security policy.

Next, in one or more of the various embodiments, control may be returned to a calling process.

Figure 23:
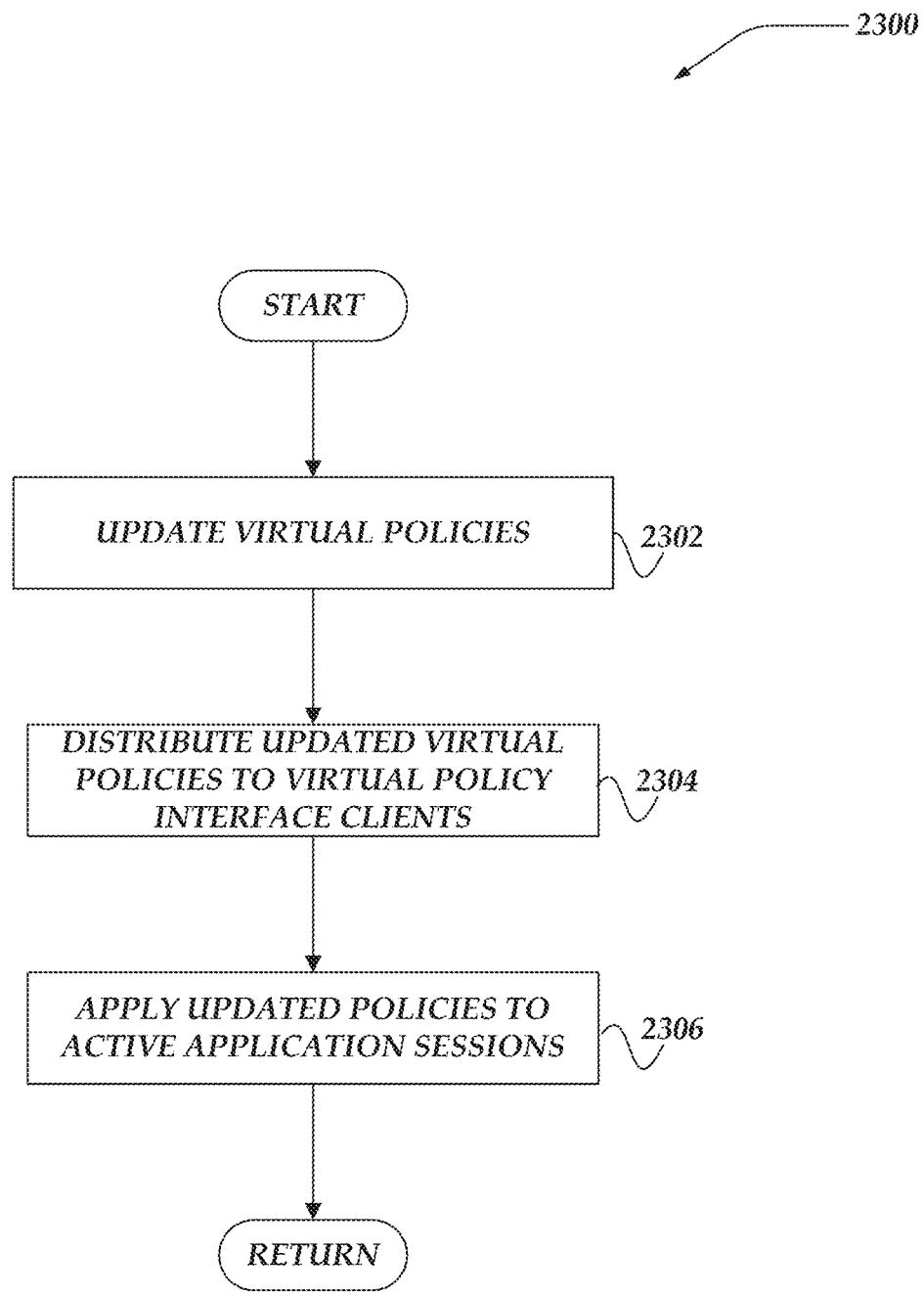
FIG. 23 illustrates a flowchart of a process for virtualized permission and security enforcement in accordance with one or more of the various embodiments.

FIG. 23 illustrates a flowchart of process 2300 for virtualized permission and security enforcement in accordance with one or more of the various embodiments. After a start block, at block 2302, in one or more of the various embodiments, virtual policy engines may be arranged to update one or more virtual security policies. As described above, in some embodiments, virtual policy engines may be deployed in a variety of configurations.

In some embodiments, virtual policy engines may be deployed alongside or as part of infrastructure security engines hosted on infrastructure security computers.

Also, in some embodiments, virtual policy engines may be deployed separate from or independent of infrastructure security engines. In some cases, in some embodiments, virtual policy engines may be configured to manage virtual security policies for one or more computers or one or more applications. In some cases, for some embodiments, virtual policy engines may be configured to be on the same host as the applications they may be protecting. Accordingly, in some embodiments, virtual policy engines may be deployed in an environment where the applications they may be protecting are not operating in a networked environment. For example, for some embodiments, if an organization has three stand-alone (non-networked) computer workstations, each workstation may host its own virtual policy engine for protecting one or more local applications.

Also, in some embodiments, virtual policy engines may be configured to manage virtual security policies for one or more computers of a plurality of computers in a networked environment. In some cases, virtual policy engines may be deployed separately from existing network security services or network management services in networking environments. Thus, in some embodiments, virtual security policies may be enforced for parts of an existing network independent of other security policies (or the absence thereof).

Accordingly, in some embodiments, in centralized deployments, virtual policy engines (or infrastructure security engines) may provide one or more user interfaces that enable administrators to define security policies, including virtual security policies, for resources in a managed network or mesh network. Thus, in some embodiments, as virtual security policies may be updated at these remote or centralized virtual policy engines, the updated virtual security policies may be automatically communicated to local virtual policy engines, mesh agents, virtual policy engine agents, or the like, that may be providing virtual policy interfaces for protected resources or protected applications.

Also, in some embodiments, in non-centralized deployments, virtual policy engines may provide user interfaces that enable administrators to define virtual security policies that may be enforced locally. Also, in some embodiments, virtual policy engines may be arranged to enable administrators to manually communicate/copy virtual security policy definitions to virtual policy engines. In the absence of network connectivity, virtual policy engines may be arranged to enable administrators to copy/share virtual security policy definitions using computer-readable media, such as USB drives, CD-ROMs, or the like.

At block 2304, in one or more of the various embodiments, virtual policy engines may be arranged to distribute the one or more updated virtual security policies to one or more virtual policy interface clients. In some embodiments, virtual policy engines may enable administrators to immediately distribute accepted or approved virtual security policies or updated virtual security policies. Also, in some embodiments, virtual policy engines may be arranged to enable administrators to set a scheduled time for new or updated virtual security policies to be distributed to virtual policy engine clients or virtual security layers. In some embodiments, virtual policy engines may be arranged to enable administrators to postpone distribution of one or more virtual security policies until another person has approved the candidate virtual security policies. Further, in some embodiments, virtual policy engines may be arranged to generate one or more notifications, alerts, log records, messages, or the like, that may indicate that one or more virtual security policies have been distributed.

At block 2306, in one or more of the various embodiments, virtual policy engines may be arranged to apply the one or more updated virtual security policies to one or more active application sessions. In some embodiments, virtual policy engines may be arranged to immediately incorporate new or updated virtual security policies into virtual policy interfaces. Also, in some embodiments, virtual policy engines may be arranged to enable administrators to schedule a time for distributed virtual security policies to become active. For example, for some embodiments, an updated virtual security policy may be associated with a start time such that if distributed it will be enforced until the scheduled time.

In some embodiments, if an updated/new virtual security policy becomes active while a user is actively using a protected application, the virtual policy engine may interrupt that user's activity if it determines the activity to be in violation of the new or updated virtual security policy. For example, in some embodiments, if an updated virtual security policy restricts an active user from using one or more features of an application, those features may become unavailable to that user without restarting the application or restarting the user's application session. Also, in some cases, in some embodiments, if the application does require a restart or session restart, virtual policy engines may be arranged to disable all application activity until the application or application session has been restarted.

Next, in one or more of the various embodiments, control may be returned to a calling process.

It will be understood that each block of the flowchart illustrations FIGS. 10-13 or FIGS. 17-23 and combinations of blocks in these flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing interactions with an application in a computing environment using one or more processors that are configured to execute instructions, wherein the execution of the instructions enables performance of actions, comprising:

determining a plurality of interactions with the application that are enforced by one or more native security policies;

generating a virtual policy interface to collect information associated with a plurality of other interactions with the application that are unassociated with the one or more native security policies; and employing a virtual policy engine to perform further actions, including:
  determining one or more activities based on the collected information associated with the plurality of other interactions, wherein a user identity is associated with the one or more activities;
  determining one or more virtual security policies associated with the plurality of other interactions based on the one or more activities and the user identity; and
  validating one or more of the plurality of other interactions based on the one or more virtual security policies, wherein the one or more validated other interactions are employed to execute one or more operations in the application, and wherein one or more other operations associated with one or more invalidated other interactions are disabled.

2. The method of claim 1, further comprises:
monitoring network traffic associated with the application;
determining an application protocol based on the network traffic and the application;
determining the collected information based on one or more portions of the network traffic and the application protocol; and
providing the collected information to the virtual security layer.

3. The method of claim 1, further comprises:
evaluating one or more submissions from the application that are provided to a local interface of the virtual policy interface, wherein the one or more submissions are associated with the application and the plurality of other interactions;
determining the collected information based on one or more submissions; and
providing the collected information to the virtual policy interface.

4. The method of claim 1, further comprises:
tracking telemetry associated with the plurality of interactions, including one or more of a keystroke, a gaze location, or a pointing device location;
determining one or more of a window, a user-interface control, or a data submission based on the telemetry; and
determining the collected information based on one or more of the window, the user-interface control, or the submitted data.

5. The method of claim 1, further comprises:
determining one or more of a window, a window class, an intra-application message, or an executed system call based on one or more of a window manager or operating system that is hosting the application; and
determining the collected information based on one or more of the window, the window class, the intra-application message, or the executed system call.

6. The method of claim 1, further comprising:
modifying the one or more virtual security policies at an infrastructure security computer that is separate from a computer that is hosting the application; and communicating the modified virtual security policies to the computer to update the virtual policy interface.

7. The method of claim 1, further comprising:
modifying the one or more virtual security policies at a computer that is hosting the application; and
updating the virtual policy interface based on the one or more modified virtual security policies.

8. The method of claim 1, further comprising:
employing one or more updates to the one or more virtual security policies to revalidate the one or more of the plurality of other interactions.

9. A network computer for managing interactions with an application, comprising:
a memory that stores at least instructions; and
one or more processors that execute instructions that are configured to cause actions, including:
determining a plurality of interactions with the application that are enforced by one or more native security policies;
generating a virtual policy interface to collect information associated with a plurality of other interactions with the application that are unassociated with the one or more native security policies; and
employing a virtual policy engine to perform further actions, including:
determining one or more activities based on the collected information associated with the plurality of other interactions, wherein a user identity is associated with the one or more activities;
determining one or more virtual security policies associated with the plurality of other interactions based on the one or more activities and the user identity; and
validating one or more of the plurality of other interactions based on the one or more virtual security policies, wherein the one or more validated other interactions are employed to execute one or more operations in the application, and wherein one or more other operations associated with one or more invalidated other interactions are disabled.

10. The network computer of claim 9, wherein the one or more processors execute instructions that are configured to cause actions, further comprising:
monitoring network traffic associated with the application;
determining an application protocol based on the network traffic and the application;
determining the collected information based on one or more portions of the network traffic and the application protocol; and
providing the collected information to the virtual policy interface.

11. The network computer of claim 9, wherein the one or more processors execute instructions that are configured to cause actions, further comprising:
evaluating one or more submissions from the application that are provided to a local interface of the virtual policy interface, wherein the one or more submissions are associated with the application and the plurality of other interactions;
determining the collected information based on one or more submissions; and
providing the collected information to the virtual policy interface.

12. The network computer of claim 9, wherein the one or more processors execute instructions that are configured to cause actions, further comprising:
tracking telemetry associated with the plurality of interactions, including one or more of a keystroke, a gaze location, or a pointing device location;
determining one or more of a window, a user-interface control, or a data submission based on the telemetry; and
determining the collected information based on one or more of the window, the user-interface control, or the submitted data.

13. The network computer of claim 9, wherein the one or more processors execute instructions that are configured to cause actions, further comprising:
determining one or more of a window, a window class, an intra-application message, or an executed system call based on one or more of a window manager or operating system that is hosting the application; and
determining the collected information based on one or more of the window, the window class, the intra-application message, or the executed system call.

14. The network computer of claim 9, wherein the one or more processors execute instructions that are configured to cause actions, further comprising:
modifying the one or more virtual security policies at an infrastructure security computer that is separate from a computer that is hosting the application; and
communicating the modified virtual security policies to the computer to update the virtual policy interface.

15. The network computer of claim 9, wherein the one or more processors execute instructions that are configured to cause actions, further comprising:
modifying the one or more virtual security policies at a computer that is hosting the application; and
updating the virtual policy interface based on the one or more modified virtual security policies.

16. The network computer of claim 9, wherein the one or more processors execute instructions that are configured to cause actions, further comprising:
employing one or more updates to the one or more virtual security policies to revalidate the one or more of the plurality of other interactions.

17. A processor readable non-transitory storage media that includes instructions configured for managing interactions with an application in a computing environment, wherein execution of the instructions by one or more processors on one or more network computers performs actions, comprising:
determining a plurality of interactions with the application that are enforced by one or more native security policies;
generating a virtual policy interface to collect information associated with a plurality of other interactions with the application that are unassociated with the one or more native security policies; and
employing a virtual policy engine to perform further actions, including:
determining one or more activities based on the collected information associated with the plurality of other interactions, wherein a user identity is associated with the one or more activities;
determining one or more virtual security policies associated with the plurality of other interactions based on the one or more activities and the user identity; and
validating one or more of the plurality of other interactions based on the one or more virtual security policies, wherein the one or more validated other interactions are employed to execute one or more operations in the application, and wherein one or more other operations associated with one or more invalidated other interactions are disabled.

18. The media of claim 17, further comprises:
monitoring network traffic associated with the application;
determining an application protocol based on the network traffic and the application;
determining the collected information based on one or more portions of the network traffic and the application protocol; and
providing the collected information to the virtual policy interface.

19. The media of claim 17, further comprises:
evaluating one or more submissions from the application that are provided to a local interface of the virtual policy interface, wherein the one or more submissions are associated with the application and the plurality of other interactions;
determining the collected information based on one or more submissions; and
providing the collected information to the virtual policy interface.

20. The media of claim 17, further comprises:
tracking telemetry associated with the plurality of interactions, including one or more of a keystroke, a gaze location, or a pointing device location;
determining one or more of a window, a user-interface control, or a data submission based on the telemetry; and
determining the collected information based on one or more of the window, the user-interface control, or the submitted data.

21. The media of claim 17, further comprises:
determining one or more of a window, a window class, an intra-application message, or an executed system call based on one or more of a window manager or operating system that is hosting the application; and
determining the collected information based on one or more of the window, the window class, the intra-application message, or the executed system call.

22. The media of claim 17, further comprising:
modifying the one or more virtual security policies at an infrastructure security computer that is separate from a computer that is hosting the application; and
communicating the modified virtual security policies to the computer to update the virtual policy interface.

23. The media of claim 17, further comprises:
modifying the one or more virtual security policies at a computer that is hosting the application; and
updating the virtual policy interface based on the one or more modified virtual security policies.

24. A system for method for managing interactions with an application, comprising:
a network computer, comprising:
a memory that stores at least instructions; and
one or more processors that execute instructions that are configured to cause actions, including:
determining a plurality of interactions with the application that are enforced by one or more native security policies;
generating a virtual policy interface to collect information associated with a plurality of other interactions with the application that are unassociated with the one or more native security policies; and
employing a virtual policy engine to perform further actions, including:
determining one or more activities based on the collected information associated with the plurality of other interactions, wherein a user identity is associated with the one or more activities;
determining one or more virtual security policies associated with the plurality of other interactions based on the one or more activities and the user identity; and
validating one or more of the plurality of other interactions based on the one or more virtual security policies, wherein the one or more validated other interactions are employed to execute one or more operations in the application, and wherein one or more other operations associated with one or more invalidated other interactions are disabled; and
a client computer, comprising:
another memory that stores at least instructions; and
one or more other processors that execute other instructions that are configured to cause actions, including:
generating one or more of plurality of interactions.

25. The system of claim 24, wherein the one or more processors of the network computer execute instructions that are configured to cause actions, further comprising:
monitoring network traffic associated with the application;
determining an application protocol based on the network traffic and the application;
determining the collected information based on one or more portions of the network traffic and the application protocol; and
providing the collected information to the virtual policy interface.

26. The system of claim 24, wherein the one or more processors of the network computer execute instructions that are configured to cause actions, further comprising:
evaluating one or more submissions from the application that are provided to a local interface of the virtual policy interface, wherein the one or more submissions are associated with the application and the plurality of other interactions;
determining the collected information based on one or more submissions; and
providing the collected information to the virtual policy interface.

27. The system of claim 24, wherein the one or more processors of the network computer execute instructions that are configured to cause actions, further comprising:
tracking telemetry associated with the plurality of interactions, including one or more of a keystroke, a gaze location, or a pointing device location;
determining one or more of a window, a user-interface control, or a data submission based on the telemetry; and
determining the collected information based on one or more of the window, the user-interface control, or the submitted data.

28. The system of claim 24, wherein the one or more processors of the network computer execute instructions that are configured to cause actions, further comprising:
determining one or more of a window, a window class, an intra-application message, or an executed system call based on one or more of a window manager or operating system that is hosting the application; and
determining the collected information based on one or more of the window, the window class, the intra-application message, or the executed system call.

29. The system of claim 24, wherein the one or more processors of the network computer execute instructions that are configured to cause actions, further comprising:
- modifying the one or more virtual security policies at an infrastructure security computer that is separate from a computer that is hosting the application; and
- communicating the modified virtual security policies to the computer to update the virtual policy interface.

30. The system of claim 24, wherein the one or more processors of the network computer execute instructions that are configured to cause actions, further comprising:
- modifying the one or more virtual security policies at a computer that is hosting the application; and
- updating the virtual policy interface based on the one or more modified virtual security policies.

* * * * *